US005491751A

United States Patent [19]

Paulson et al.

[11] Patent Number: 5,491,751

[45] Date of Patent: Feb. 13, 1996

[54] INTELLIGENT ACCOMPANIMENT APPARATUS AND METHOD

[75] Inventors: John W. Paulson, Edina; Stephen P. Weisbrod, Minnetonka; Mark E. Dunn, Apple Valley, all of Minn.

[73] Assignee: Coda Music Technology, Inc., Minn.

[21] Appl. No.: 461,429

[22] Filed: Jun. 5, 1995

Related U.S. Application Data

[62] Division of Ser. No. 65,831, May 21, 1993.

[51] Int. Cl.[6] .......... H04L 9/00

[52] U.S. Cl. .......... 380/25; 380/47

[58] Field of Search .......... 380/23–25, 47

[56] References Cited

U.S. PATENT DOCUMENTS

| | | | |
|---|---|---|---|
| 4,471,163 | 9/1984 | Donald et al. . | |
| 4,562,306 | 12/1985 | Chou et al. . | |
| 4,593,353 | 6/1986 | Pickholtz . | |
| 4,621,321 | 11/1986 | Boebert et al. . | |
| 4,670,857 | 6/1987 | Rackman | 380/23 |
| 4,685,055 | 8/1987 | Thomas . | |
| 4,688,169 | 8/1987 | Joshi . | |
| 4,740,890 | 4/1988 | William . | |
| 4,754,836 | 5/1988 | Dannenberg . | |
| 4,817,140 | 3/1989 | Chandra et al. | 380/25 |
| 4,916,738 | 4/1990 | Chandra et al. | 380/25 |
| 5,034,980 | 7/1991 | Kubota . | |
| 5,056,009 | 10/1991 | Mizuta . | |
| 5,113,518 | 5/1992 | Durst, Jr. et al. . | |
| 5,131,091 | 7/1992 | Mizuta . | |
| 5,144,659 | 9/1992 | Jones | 380/25 |
| 5,148,534 | 9/1992 | Comerford | 380/24 |
| 5,272,754 | 12/1993 | Boebert | 380/25 |
| 5,371,792 | 12/1994 | Asai et al. | 380/23 |

OTHER PUBLICATIONS

P. Allen et al., "Tracking Musical Beats in Real Time," *ICMC Glascow 1990 Proceedings,* (1990), pp. 140–143.

J. Bloch et al., "Real–Time Computer Accompaniment of Keyboard Performances," *Proceedings of International Computer Music Conference,* (1985), pp. 279–290.

W. Buxton et al., "The Computer as Accompaniest," *CHI '86 Proceedings,* (Apr. 1986), pp. 41–43.

P. Capell et al., "Instructional Design and Intelligent Tutoring: Theory and the Prcision of Design," *Jl. of Artificial Intelligence in Education,* (1993) 4(1), pp. 95–121.

R. Dannenberg, "Music Representation Issues, Techniques, and Systems,"*Computer Music Journal, pl 17:3 (Fall 1993), pp. 20–30.*

R. Dannenberg et al., "Results from the Piano Tutor Project," *The Fourth Biennial Arts & Technology Symposium,* Connecticut College (Mar. 1993), pp. 143–149.

R. Dannenberg, "Software Support for Interactive Multimedia Performance," *Interface,* vol. 22 (1993), pp. 213–228.

R. Dannenberg et al., "Human–Computer Interaction in the Piano Tutor," *Multimedia Interface Design,* (1992), pp. 65–78.

(List continued on next page.)

*Primary Examiner*—Salvatore Cangialosi
*Attorney, Agent, or Firm*—Merchant, Gould, Smith, Edell, Welter & Schmidt

[57] ABSTRACT

A system for interpreting the requests and performance of an instrumental soloist, stated in the parlance of the musician and within the context of a specific published edition of music the soloist is using, to control the performance of a digitized musical accompaniment. Sound events and their associated attributes are extracted from the soloist performance and are numerically encoded. The pitch, duration and event type of the encoded sound events are then compared to a desired sequence of the performance score to determine if a match exists between the soloist performance and the performance score. If a match exists between the soloist performance and the performance score, the system instructs a music synthesizer module to provide an audible accompaniment for the soloist. The system can provide an accompaniment for a selectable amount of time even if the soloist intentionally or unintentionally departs from the score.

2 Claims, 16 Drawing Sheets

OTHER PUBLICATIONS

R. Dannenberg et al., "Practical Aspects of a Midi Conducting Program," *Proceedings of International Computer Music Conference,* (1991), pp. 537-540.

R. Dannenberg, "Software Support for Interactive Multimedia Performance," *Proceedings The Arts and Technology 3,* The Center for Art and Technology at Connecticut College, (1991), pp. 148–156.

R. Dannenberg, *Real–Time Computer Accompaniment, Copyright 1990 Roger B. Dannenberg, Handout at Accoustical Society of America May 1990, pp. 1–10.*

R. Dannenberg, "Recent work in real–time music understanding by computer," *Music, Language, Speech and Brain,* Wenner–Gren International Symposium Series, vol. 59, (1990), pp. 194–202.

R. Dannenberg et al., "An Expert System for Teaching Piano to Novices," *ICMC Glasgow Proceedings, (1990), pp. 20–23.*

R. Dannenberg, "Real Time Control For Interactive Computer Music and Animation," *The Arts & Technology II: A Symposium,* Connecticut College, (1989), pp. 85–95.

R. Dannenberg, "Real–Time Scheduling and Computer Accompaniment," *Current Directions in Computer Music Research,* (1989), pp. 225–261.

R. Dannenberg et al., "New Techniques for Enhanced Quality of Computer Accompaniment," *ICMC Proceedings,* (1988), pp. 243–249.

R. Dannenberg et al., "Following an Improvisation in Real Time," *ICMC Proceedings,* ICMA pub., (1987), pp. 241–248.

R. Dannenberg, "An On–Line Algorithm for Real–Time Accompaniment," Copyright 1985 Roger B. Dannenberg, *ICMC '84 Proceedings,* pp. 193–198.

L. Grubb et al., "Automated Accompaniment of Musical Ensembles," *Proceedings of 12th National Conference on Artificial Intelligence,* (1994), pp. 94–99.

J. Lifton, "Some Technical and Aesthetic Considerations in Software for Live Interactive Performance," *ICMC '85 Proceedings,* (1985), pp. 303–306.

M. Puckette et al., "Score following in practice," *ICMC Proceedings,* ICMA pub. (1992), pp. 182–185.

B. Vercoe, "The Synthetic Performer in the Context of Live Performance," *ICMC '84 Proceedings,* (1984), pp. 199–200.

B. Vercoe et al., "Synthetic Rehearsal: Training the Synthetic Performance," *ICMC '85 Proceedings,* (1985), pp. 275–289.

F. Weinstock, "Demonstration of Concerto Accompanist, a Program for the Macintosh Computer," *Demonstration of Concerto Accompanist,* Sep. 1993, pp. 1–3.

INTELLIGENT ACCOMPANIMENT APPARATUS AND METHOD

This is a division of application Ser. No. 08/065,831, filed May 21, 1993, which application are incorporated herein by reference still pending.

FIELD OF THE INVENTION

The present invention relates to a method and associated apparatus for providing automated accompaniment to a solo performance.

BACKGROUND OF THE INVENTION

U.S. Pat. No. 4,745,836, issued May 24, 1988, to Dannenberg describes a computer system which provides the ability to synchronize to and accompany a live performer. The system converts a portion of a performance into a performance sound, compares the performance sound and a performance score, and if a predetermined match exists between the performance sound and the score provides accompaniment for the performance. The accompaniment score is typically combined with the performance.

Dannenberg teaches an algorithm which compares the performance and the performance score on an event by event basis, compensating for the omission or inclusion of a note not in the performance score, improper execution of a note or departures from the score timing.

The performance may be heard live directly or may emerge from a synthesizer means with the accompaniment. Dannenberg provides matching means which receive both a machine-readable version of the audible performance and a machine-readable version of the performance score. When a match exists within predetermined parameters, a signal is passed to an accompaniment means, which also receives the accompaniment score, and subsequently the synthesizer, which receives the accompaniment with or without the performance sound.

While Dannenberg describes a system which can synchronize to and accompany a live performer, in practice the system tends to lag behind the performer due to processing delays within the system. Further, the system relies only upon the pitch of the notes of the soloist performance and does not readily track a pitch which falls between standard note pitches, nor does the system provide for the weighting of a series of events by their attributes of pitch, duration, and real event time.

Therefore, there is a need for an improved means of providing accompaniment for a smooth natural performance in a robust, effective time coordinated manner that eliminates the unnatural and "jumpy" tendency of the following apparent in the Dannenberg method.

SUMMARY OF THE INVENTION

The present invention provides a system for interpreting the requests and performance of an instrumental soloist, stated in the parlance of the musician and within the context of a specific published edition of music the soloist is using, to control the performance of a digitized musical accompaniment. Sound events and their associated attributes are extracted from the soloist performance and are numerically encoded. The pitch, duration and event type of the encoded sound events are then compared to a desired sequence of the performance score to determine if a match exists between the soloist performance and the performance score. If a match exists between the soloist performance and the performance score, the system instructs a music synthesizer module to provide an audible accompaniment for the soloist. The system can continue the accompaniment for a selectable amount of time even if the soloist intentionally or unintentionally departs from the score.

A repertoire data file contains music, control, and information segments. The music segments include the music note sequence and preset information; the control segments include music marks, time signature, instrumentation, intelligent accompaniment, and user option information; the information segments include composer biography, composition, performance information, and other terms and symbols. The repertoire file allows the soloist to indicate start and stop points in the play of the music, accompanying instrumentation, or to designate sections of music to be cut or altered in tempo. All of these indications are made by reference to a specific published edition of the music and expressed in the idiom common to musical rehearsal and performance.

DETAILED DESCRIPTION OF THE PREFERRED EMBODIMENTS

A portion of the disclosure of this patent document contains material which is subject to copyright protection. The copyright owner has no objection to the facsimile reproduction by any one of the patent disclosure, as it appears in the Patent and Trademark Office patent files or records, but otherwise reserves all copyright rights whatsoever.

In the following detailed description of the preferred embodiments, reference is made to the accompanying drawings which form a part hereof, and in which is shown by way of illustration specific embodiments in which the invention may be practiced. It is to be understood that other embodiments may be utilized and structural changes may be made without departing from the scope of the present invention.

The present invention provides a system and method for a comparison between a performance and a performance score in order to provide coordinated accompaniment with the performance. A system with generally the same objective is described in U.S. Pat. No. 4,745,836, issued May 24, 1988, to Dannenberg, which is hereby incorporated by reference.

Figure 1:
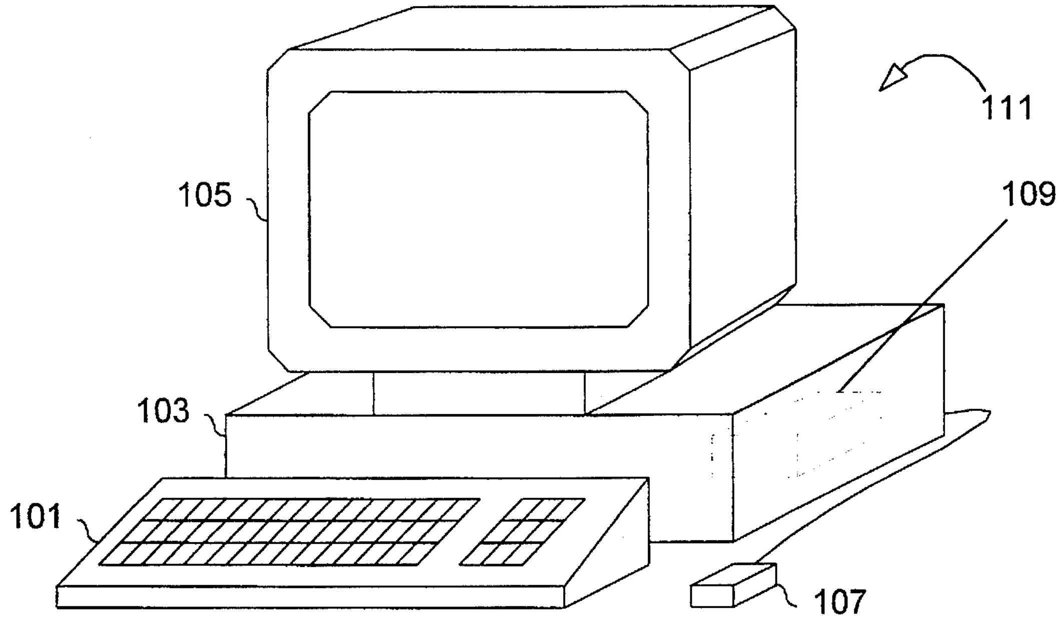
FIG. 1 is a perspective view of the components of a digital computer according to the present invention.

FIG. 1 shows the components of a computer workstation 111 that may be used with the system. The workstation includes a keyboard 101 by which a user may input data into a system, a computer chassis 103 which holds electrical components and peripherals, a screen display 105 by which information is displayed to the operator, and a pointing device 107, typically a mouse, with the system components logically connected to each other via internal system bus within the computer. Intelligent accompaniment software which provides control and analysis functions to additional system components connected to the workstation is executed a central processing unit 109 within the workstation 111.

Figure 2:
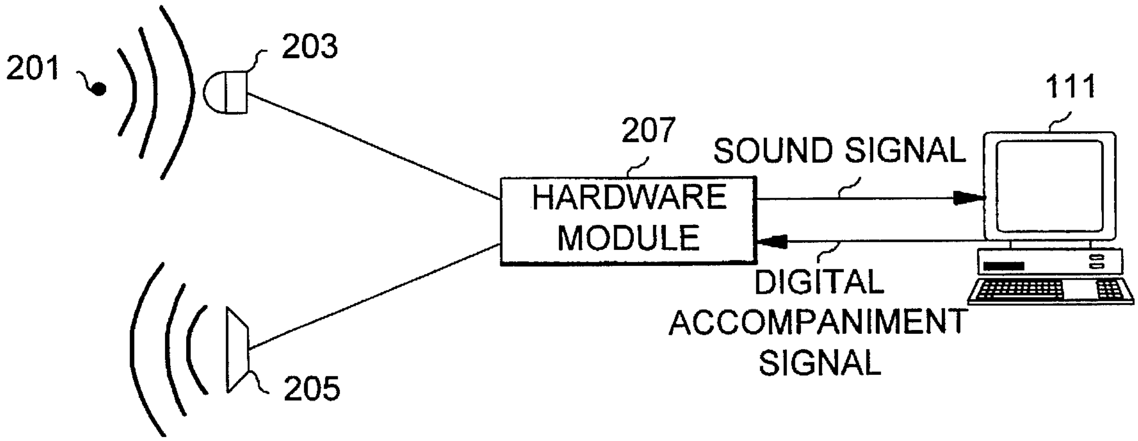
FIG. 2 is a block diagram of the high level logical organization of an accompaniment system according to the present invention.

The workstation 111 is used as part of a preferred intelligent accompaniment (IA) system as shown in FIG. 2. A microphone 203 preferably detects sounds emanating from a sound source 201. The sound signal is typically transmitted to a hardware module 207 where it is converted to a digital form. The digital signal is then sent to the workstation 111, where it is compared with a performance score and a digital accompaniment signal is generated. The digital accompaniment signal is then sent back to the hardware module 207 where the digital signal is converted to an analog sound signal which is then typically applied to a speaker 205. It will be recognized that the sound signal may be processed within the hardware module 207 without departing from the invention. It will further be recognized that other sound generation means such as headphones may be substituted for the speaker 205.

Figure 5:
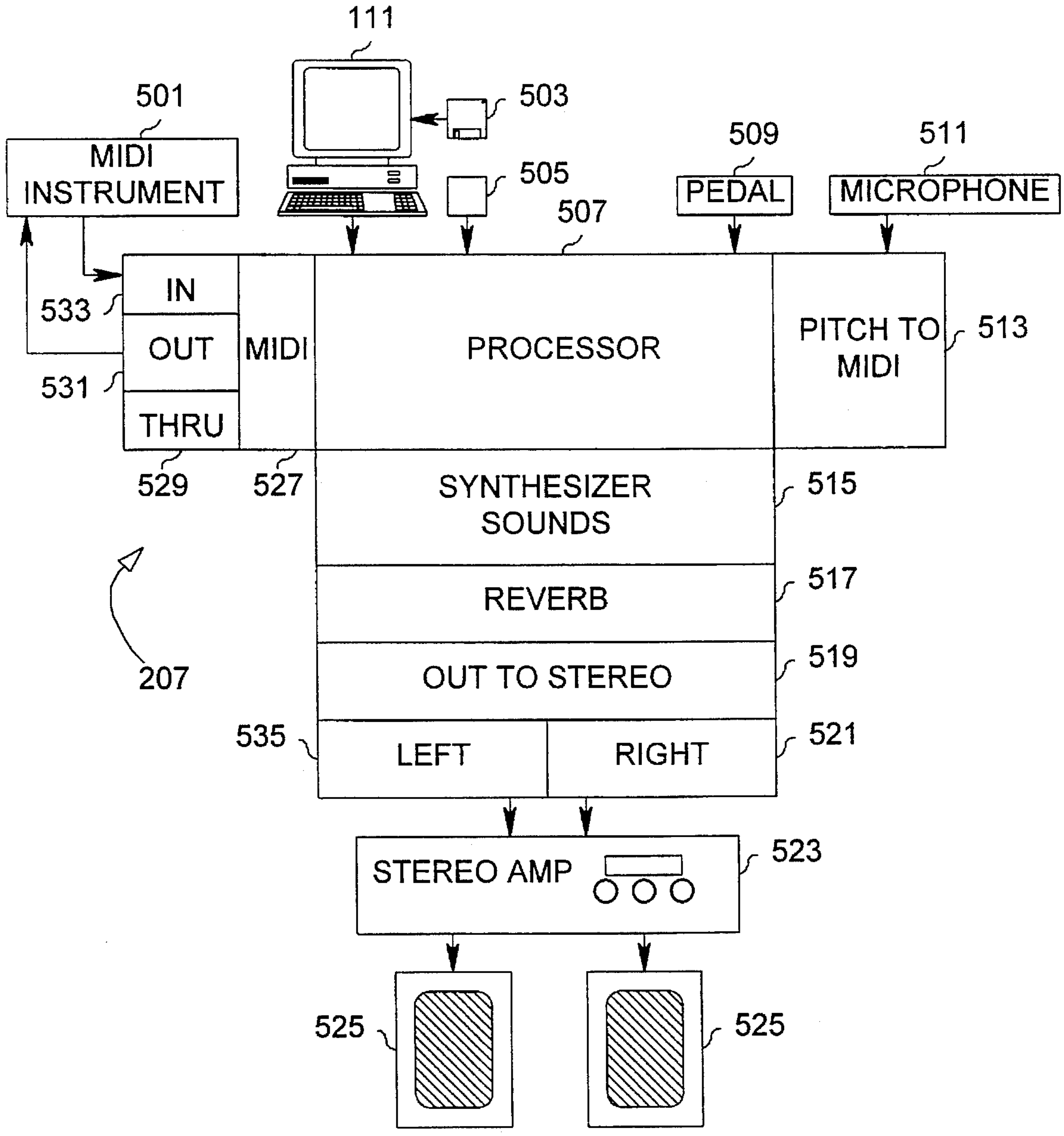
FIG. 5 is a block diagram of the high level hardware organization of an accompaniment system according to the present invention.

A high level view of the hardware module 207 for a preferred IA system is given in FIG. 5. Optionally, a musical instrument digital interface (MIDI) compatible instrument 501 is connected to a processor 507 through a MIDI controller 527 having an input port 533, output port 531, and a through port 529. The MIDI instrument 501 may connect directly to the IA system. Alternatively, a microphone 511 may be connected to a pitch-to-MIDI converter 513 which in turn is connected to processor 507. The workstation 111 is connected to the processor 507 and is used to transmit musical performance score content 503, stored on removable or fixed media, and other information to the processor 507. A data cartridge 505 is used to prevent unauthorized copying of content 503. Once the processor 507 has the soloist input and musical performance score content 503, the digital signals for an appropriate accompaniment are generated and then typically sent to a synthesizer module 515. The synthesizer interprets the digital signals and provides an analog sound signal which has reverberation applied to it by a reverb unit 517. The analog sound signal is sent through a stereo module 519 which splits the signal into a left channel 535 and a right channel 521, which then typically are sent through a stereo signal amplifier 523 and which then can be heard through speakers 525. Pedal input 509 provides an easy way for a user to issue tempo, start and stop instructions.

Figure 3:
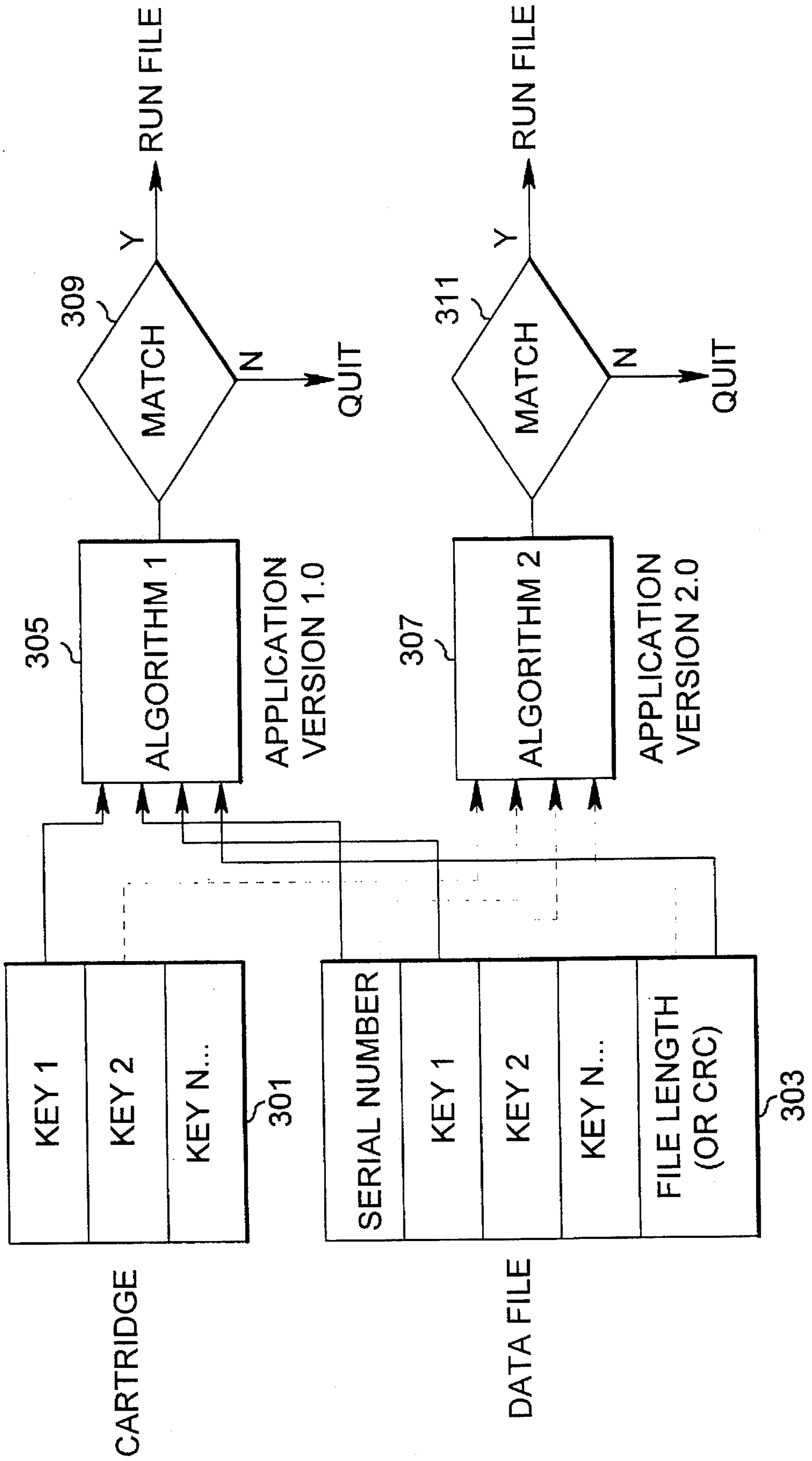
FIG. 3 is a flow diagram showing an encryption key and algorithm selection process according to the present invention.

FIG. 3 illustrates the data protection algorithm used to protect repertoire data content 503 from unauthorized access. A series of data encryption keys 305 to be used with a predetermined number of encryption algorithms 305, 307 are stored within the data cartridge 505. A data file 303, stored in contect file 503 contains a serial number value, a file length or cyclical redundancy check (CRC) value, and a predetermined series of target data keys each generated from the serial number and file length or CRC value by each of the encryption data keys 301 and each of the predetermined number of encryption algorithms 305, 307. An application software program executing on the workstation 111 has one of the predetermined number of encryption algorithms 305, 307 encoded within it. When a repertoire data file is to be used, the application software program extracts the serial number and the file length value from it, selects one of the data encryption data keys 301 from the data cartridge, and uses the pre-encoded encryption algorithm 305, 307 contained within the program to generate a resultant key value. At 309, 311 the resultant key value is compared to each of the target key values contained within the data file 303. If one of the target key values matches the resultant key value, the data file is run; otherwise, execution terminates. Accordingly, a new algorithm may be used with each new release of the application software, up to the number of unique keys or in the data cartridge file 301 and file 303. Each new release is backward compatible with exiting files 301 and 303. However, if a file 301 or 303 does not contain a matching key for a newer verson of the application, the application will not run. In use, the keys and algorithms are determined prior to the initial release of the application, such that the initial realses, files 301 and 303 contain the large to correspond to future versions of the application with new algorithms.

Figure 6:
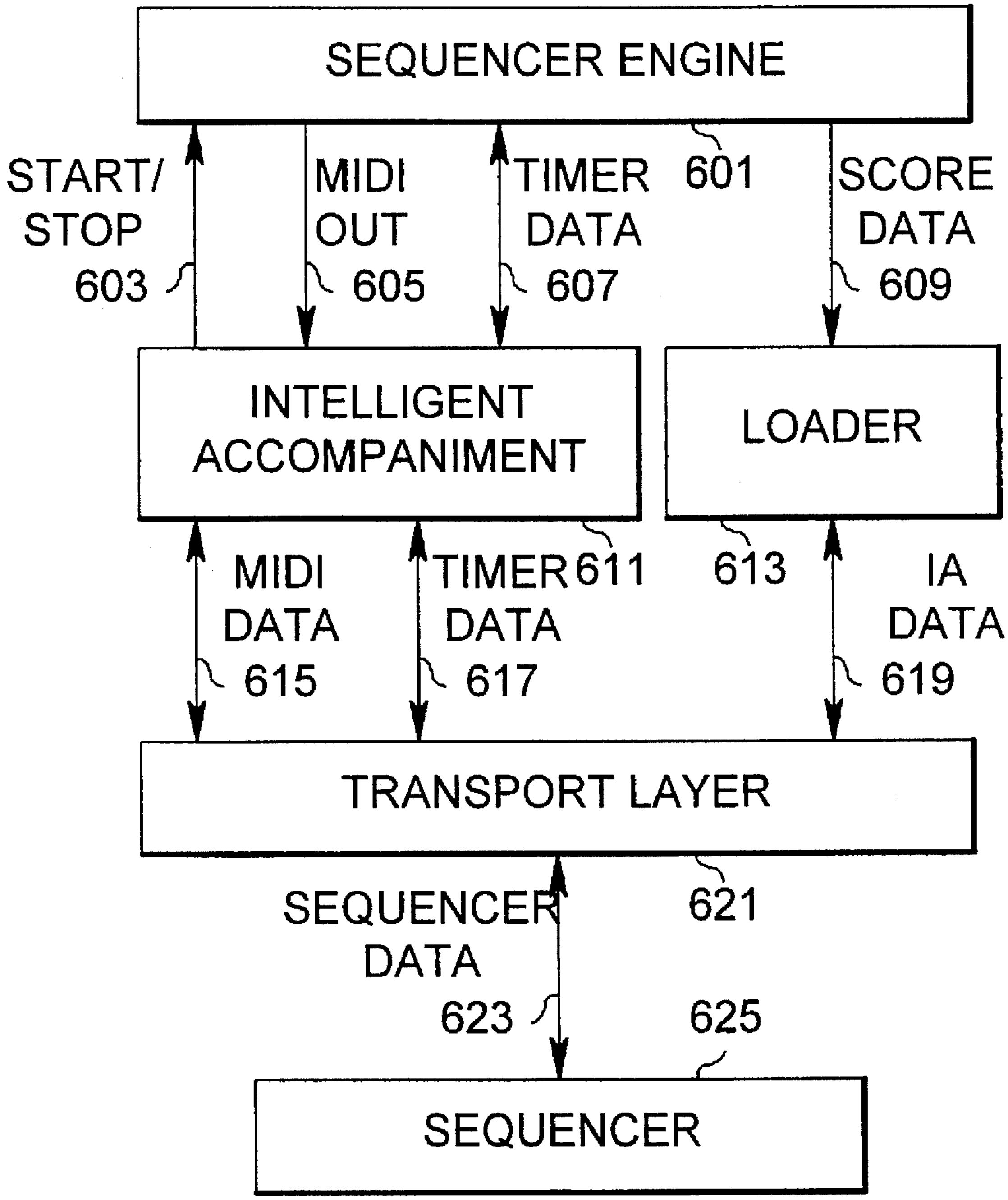
FIG. 6 is a block diagram of a high level data flow overview according to the present invention.

The data flow between logical elements of a preferred IA system is described in FIG. 6. A sequencer engine 601 outputs MIDI data based at the current tempo and current position within the musical performance score, adjusts the current tempo based on a tempo map, sets a sequence position based on a repeats map, and filters out unwanted instrumentation. The sequencer engine 601 typically receives musical note start and stop data 603 and timer data 607 from an IA module 611, and sends corresponding MIDI out data 605 back to the IA module 611. The sequencer engine 601 further sends musical score data 609 to a loader 613 which sends and receives such information as presets, reverb settings, and tunings data 619 to and from the transport layer 621. The transport layer 621 further sends and receives MIDI data 615 and timer data 617 to and from the IA module 611. A sequencer 625 can preferably send and receive sequencer data 623, which includes MIDI data 615, timer data 617, and IA data 619, to and from the IA system through the transport layer 621.

Figure 7:
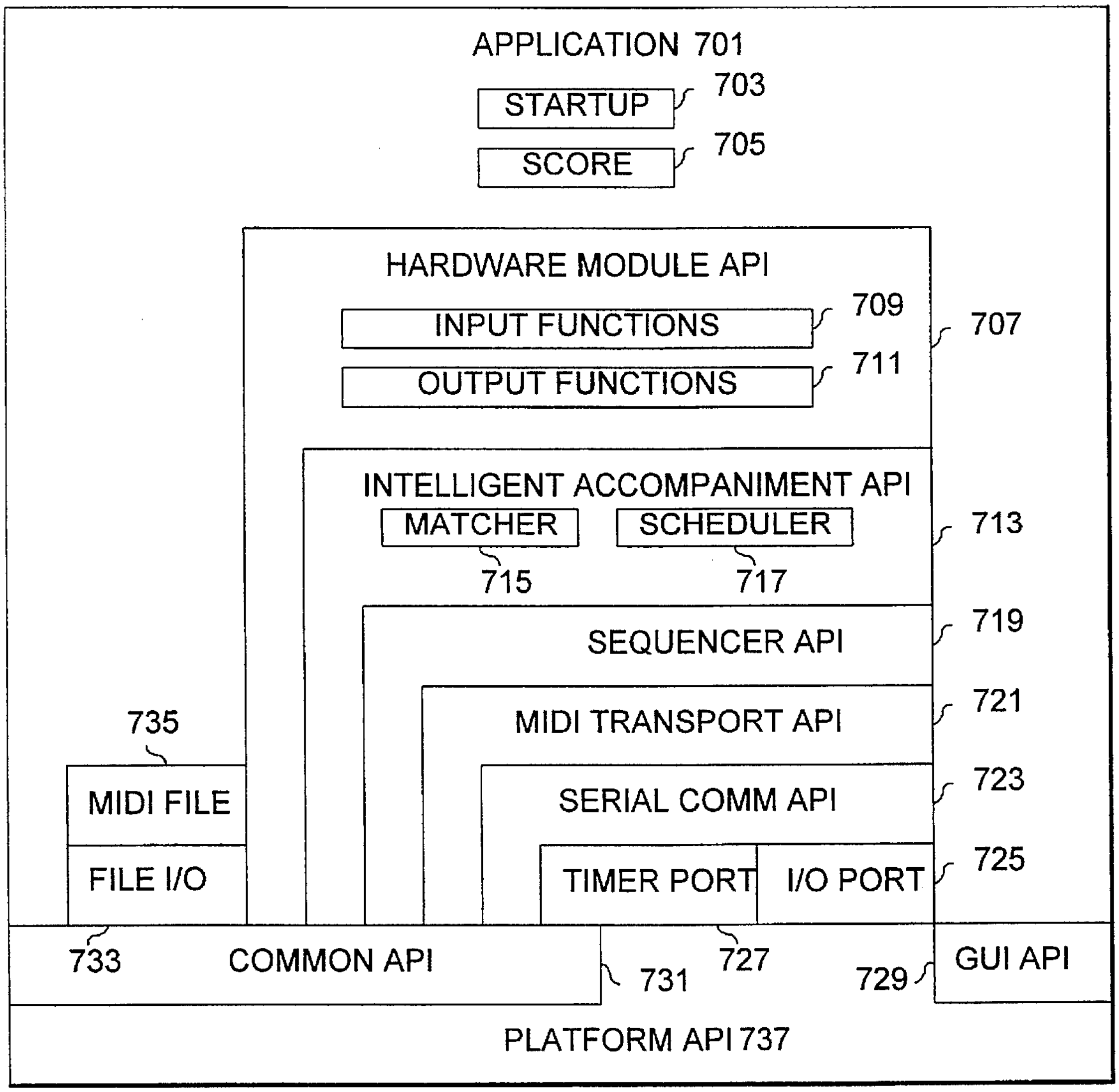
FIG. 7 is a block diagram of a high level interface between software modules according to the present invention.

The interface between the software modules of a preferred IA system is illustrated in FIG. 7. A high level application 701 having a startup object 703 and a score object 705 interact with a graphic user interface (GUI) application program interface (API) 729 and a common API 731. The common API 731 provides operating system functions that are isolated from platform-specific function calls, such as memory allocation, basic file input and output (I/O), and timer functions. A file I/O object 733 interacts with the common API 731 to provide MIDI file functions 735. A platform API 737 is used as basis for the common API 731 and GUI API 729 and also interacts with timer port object 727 and I/O port object 725. The platform API 737 provides hardware platform-specific API functions. A serial communication API 723 interacts with the timer port object 727 and I/O port object 725, and is used as a basis for a MIDI transport API 721 which provides standard MIDI file loading, saving, and parsing functions. A sequencer API 719 comprises a superset of and is derived from the MIDI transport API 721 and provides basic MIDI sequencer capabilities such as loading or saving a file, playing a file including start, stop, and pause functions, positioning, muting, and tempo adjustment. An IA API 713 comprises a superset of and is derived from the sequencer API 719 and adds IA matching capabilities to the sequencer. A hardware module API 707 having input functions 709 and output functions 711 comprises a superset of and is derived from the IA API 713 and adds the hardware module protocol to the object. The IA application 701 is the main platform independent application containing functions to respond to user commands and requests and to handle and display data.

Figure 8:
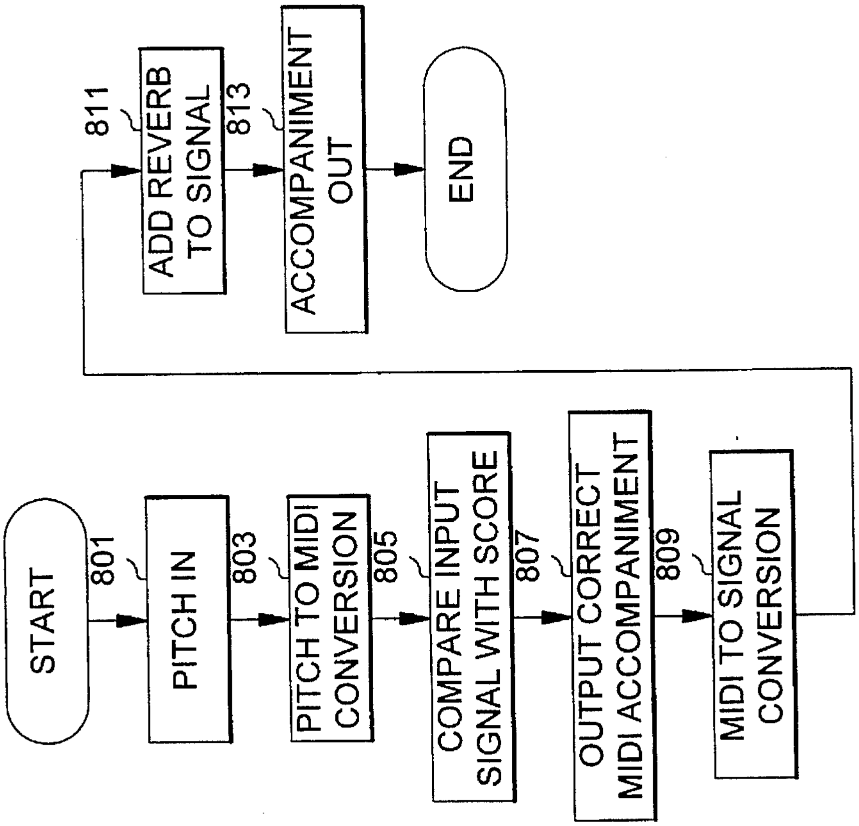
FIG. 8 is a flow diagram of a high level interface between software modules according to the present invention.

FIG. 8 describes the flow control of the overall operation of the preferred IA system shown in FIG. 2. At 801 a pitch is detected by the system and converted to MIDI format input signal at 803. The input signal is sent from the hardware module 207 to the workstation 111 (FIG. 2) and compared with a musical performance score at 805 and a corresponding MIDI accompaniment output signal is generated and output at 807. The MIDI output signal is converted back to an analog sound signal at 809, reverberation is added at 811, and the final sound signal is output to a speaker at 813.

Figure 9:
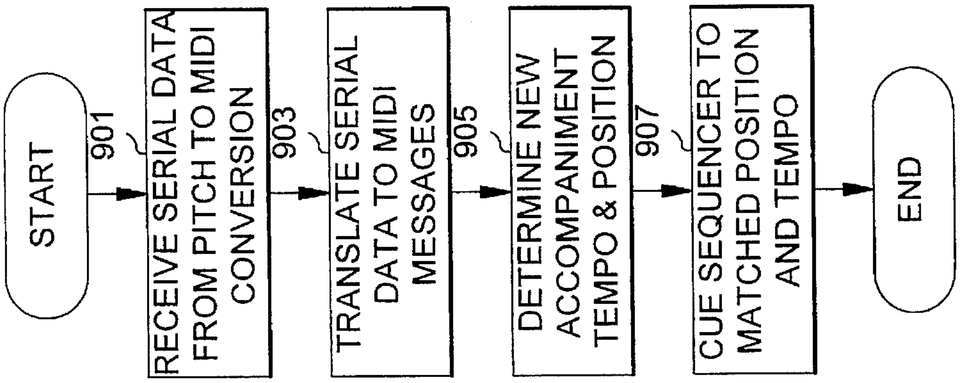
FIG. 9 is a flow diagram of a computerized music data input process according to the present invention.

FIG. 9 shows the input process flow control of FIG. 8. At 901 serial data is received from the pitch to MIDI converter and translated into MIDI messages at 903. A new accompaniment, tempo, and position are determined at 905 and a sequencer cue to the matched position and tempo generated at 907.

Figure 10:
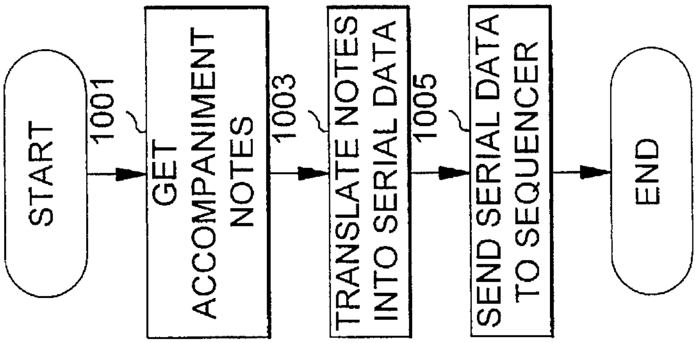
FIG. 10 is a flow diagram of a computerized music data output process according to the present invention.

FIG. 10 shows the output process flow control of FIG. 8. At 1001 accompaniment notes are received and translated into serial data at 1003. The serial data is then sent to the sequencer at 1005.

Figure 11:
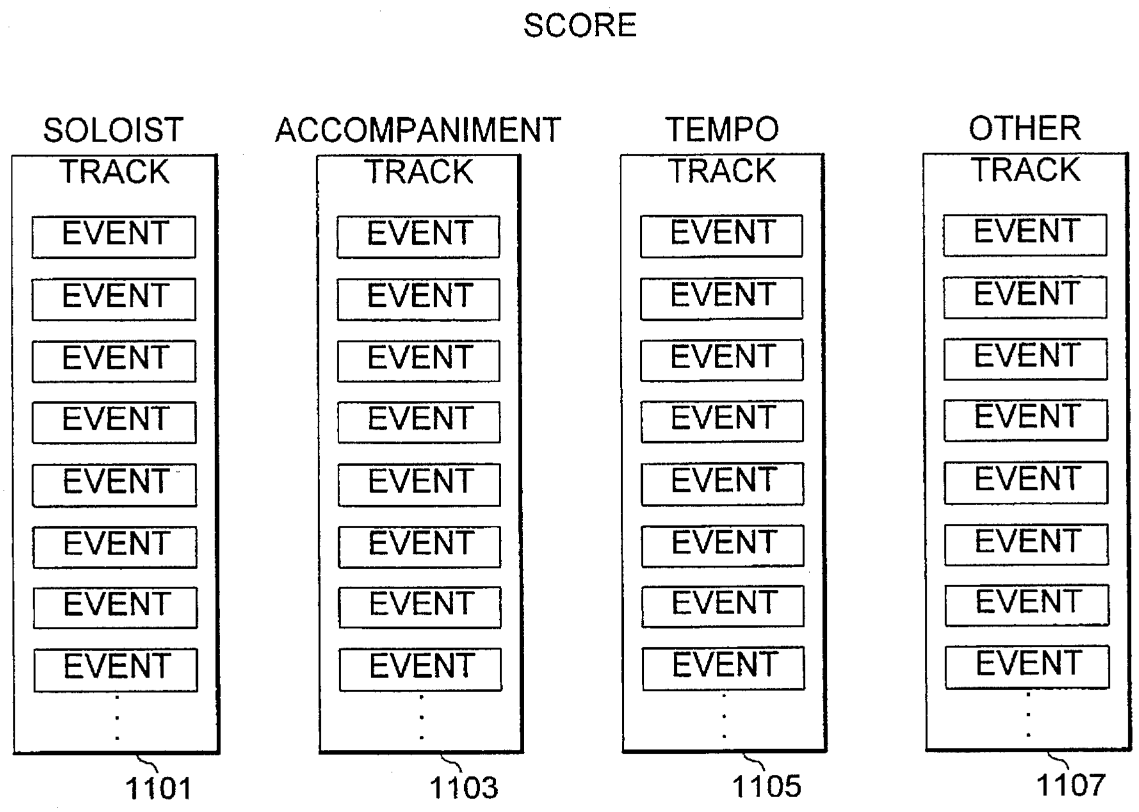
FIG. 11 is a block diagram of data objects for a musical performance score according to the present invention.

FIG. 11 reveals data objects for a musical performance score. A score is divided into a number of tracks which correspond to a specific aspect of the score, with each track having a number of events. A soloist track 1101 contains the musical notes and rests the soloist performer plays; an accompaniment track 1103 contains the musical notes and rests for the accompaniment to the soloist track 1101; a tempo track 1105 contains the number of beats per measure and indicates tempo changes; an other track 1107 contains other events of importance to the score including instrumental changes and rehearsal marks.

Figure 12:
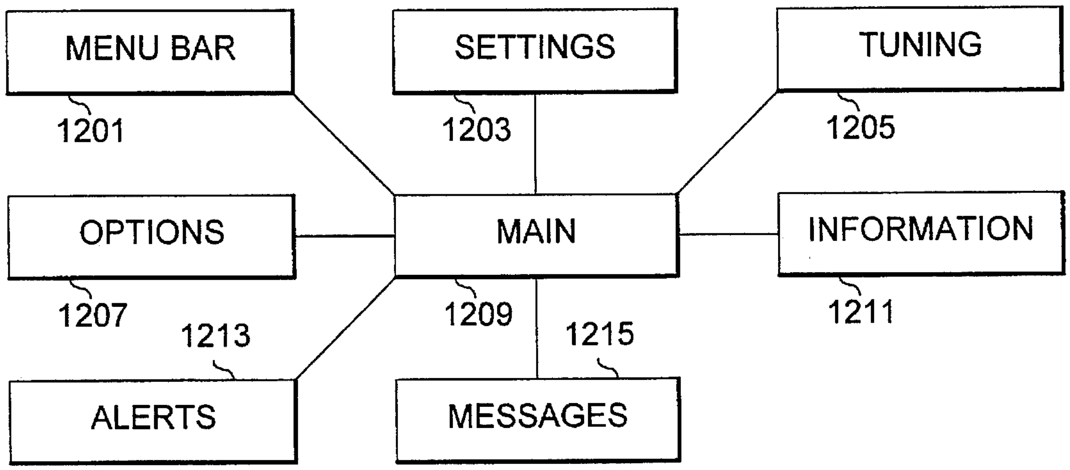
FIG. 12 is a block diagram of main software modules according to the present invention.
Figure 19:
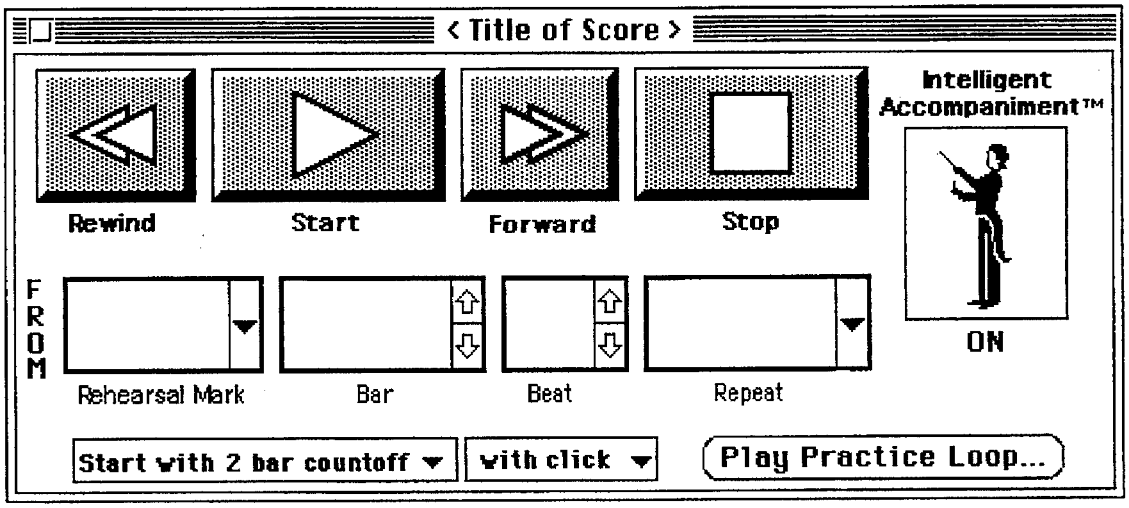
FIG. 19 is a screen display of a main play control window according to the present invention.
Figure 23:
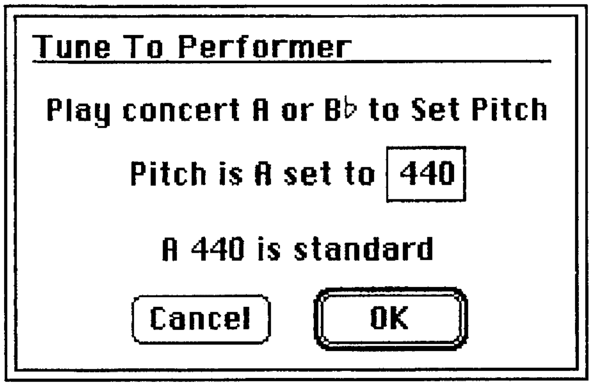
FIG. 23 is a screen display of a tune to performer window according to the present invention.
Figure 22:
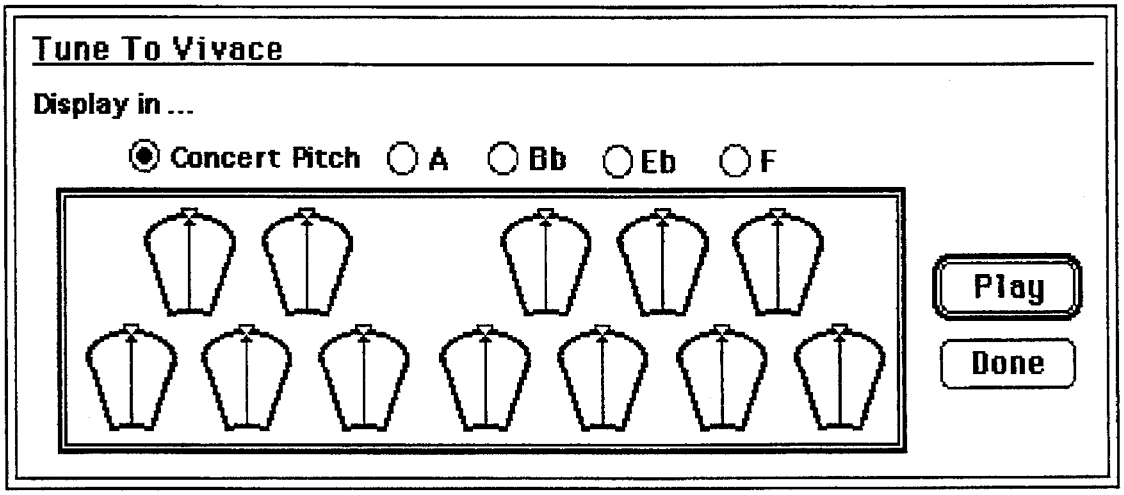
FIG. 22 is a screen display of a tune to accompanist window according to the present invention.
Figure 29:
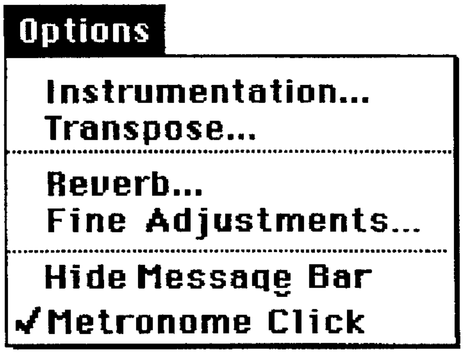
FIG. 29 is a screen display of a user options window according to the present invention.
Figure 35:
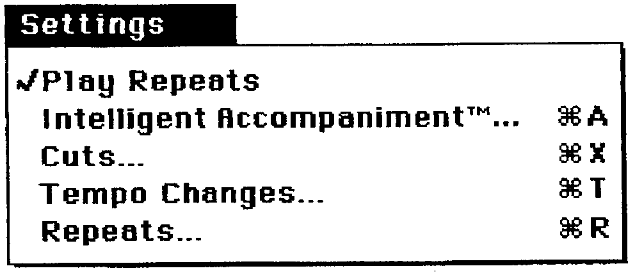
FIG. 35 is a screen display of a settings window according to the present invention.

FIG. 12 shows preferred main software modules. A main play control module 1209 receives user input and invokes appropriate function modules in response to selections made by the user, as shown in FIG. 19. Because the preferred software uses a GUI, the display modules are kept simple and need only invoke the system functions provided by the windowing system. A system menu bar 1201 provides operating system control functions; a settings module 1203 allows the editing of system settings as shown in FIG. 35; a tuning module 1205 allows a soloist to tune to the system as shown in FIG. 22, or the system to tune to the soloist as shown in FIG. 23; an options module 1203 allows the editing of user settings as shown in FIG. 29; an information module 1211 provides information about the system; an alerts module 1213 notifies a user of any alerts; and a messages module 1215 provides system messages to the user. The software is written in the 'C' programming language and runs on Apple MacIntosh computers.

Figure 13:
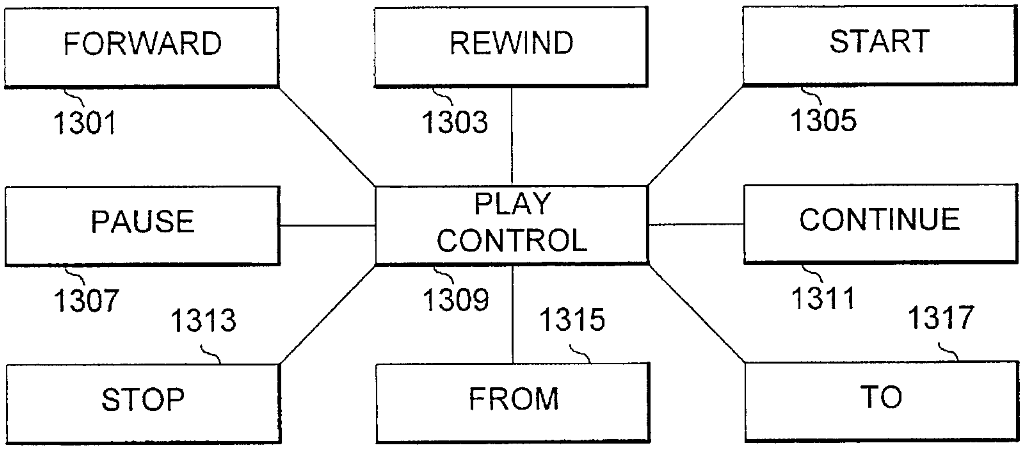
FIG. 13 is a block diagram of play control software modules according to the present invention.
Figure 20:
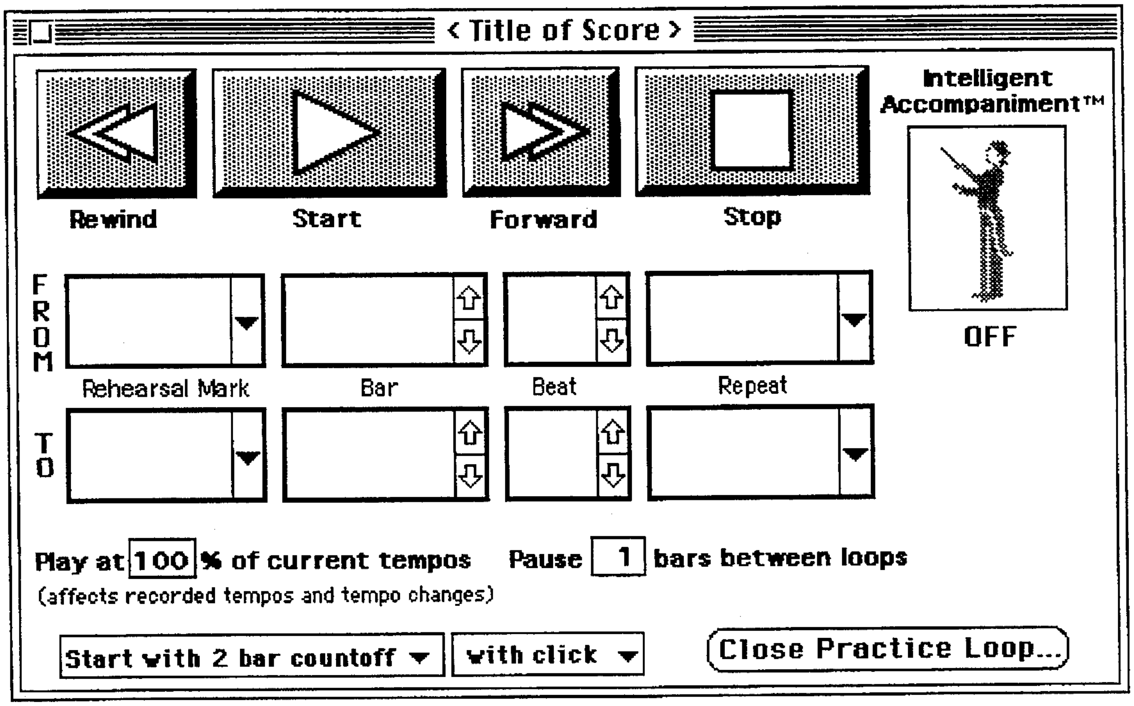
FIG. 20 is a screen display of a main play control loop window with practice loop controls according to the present invention.

FIG. 13 shows a preferred play control software module. A main play control module 1309 receives program commands and invokes specialized play functions as appropriate in response to selections made by the user, as shown in FIG. 19. The play control module 1309 provides play and positioning functions similar in concept to well-known cassette tape players. Positioning functions include forward 1301 and rewind 1303. Play functions include start 1305, pause 1307, continue 1311, and stop 1315. Functions to control which section of the score is to be played as a practice loop as shown in FIG. 20 include a 'from' function 1315 and a 'to' function 1317, wherein a user may specify a rehearsal mark, bar, beat, or repeat.

Figure 14:
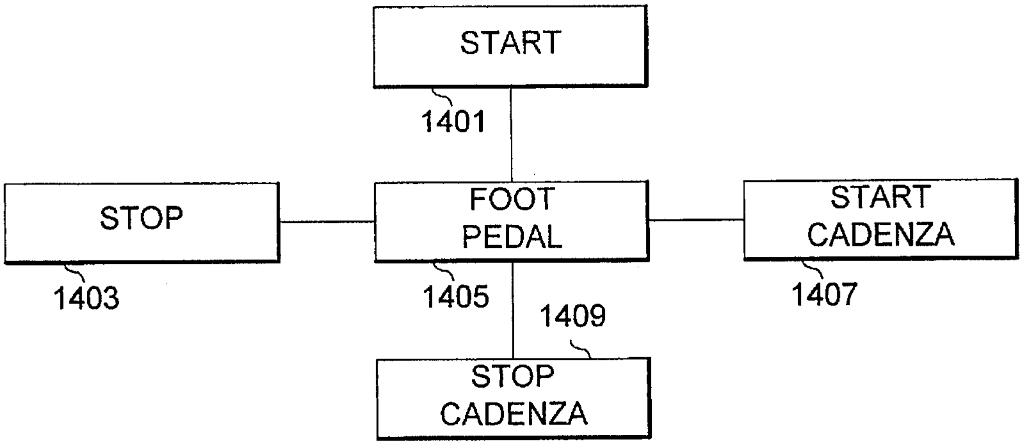
FIG. 14 is a block diagram of foot pedal software modules according to the present invention.

FIG. 14 shows a preferred foot pedal control software module. The module controls an optional foot pedal 509 (FIG. 5) which may be attached to the system allowing an easy way for a user to issue tempo, start and stop instructions. A main foot pedal module 1405 receives program commands and invokes specialized foot pedal functions start 1401, stop 1403, start cadenza 1407, and stop cadenza 1409 as appropriate in response to selections made by the user.

Figure 15:
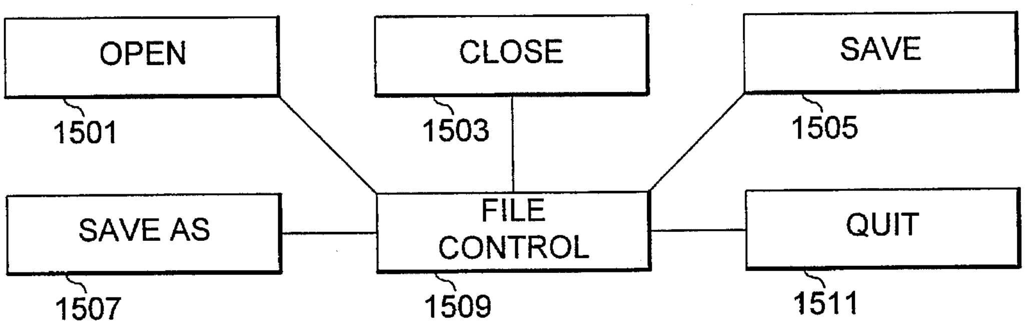
FIG. 15 is a block diagram of file control software modules according to the present invention.

FIG. 15 shows a preferred file control software module. It will be recognized that file functions may be provided by either a built-in operating system function or by a module located within the applications software. A main file control module 1509 receives program commands and invokes specialized file functions open 1501, close 1503, save 1505, save as 1507, and quit 1509 as appropriate in response to selections made by the user.

Figure 16:
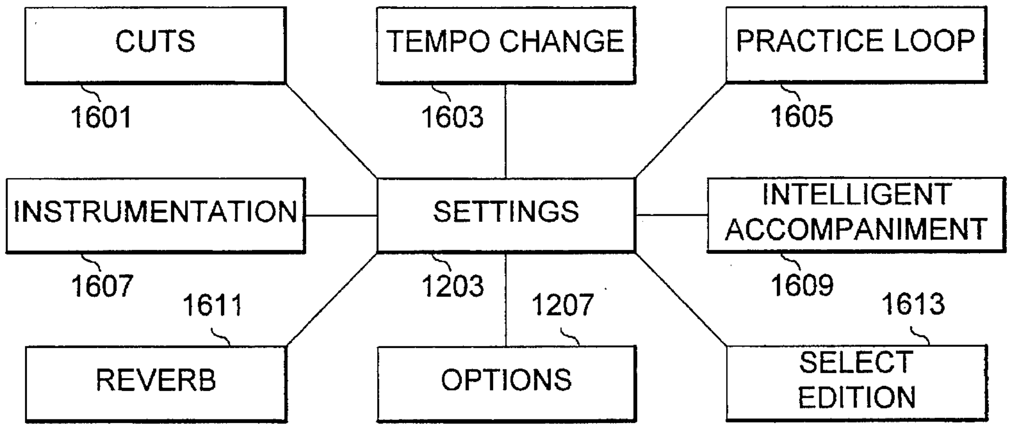
FIG. 16 is a block diagram of settings software modules according to the present invention.
Figure 21:
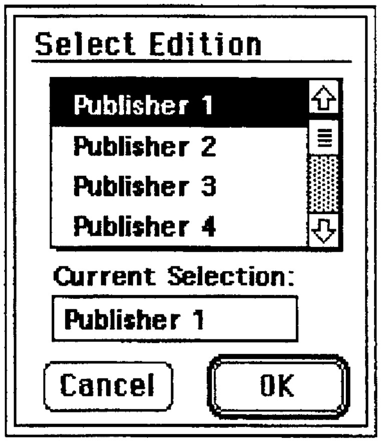
FIG. 21 is a screen display of a select edition window according to the present invention.
Figure 24:
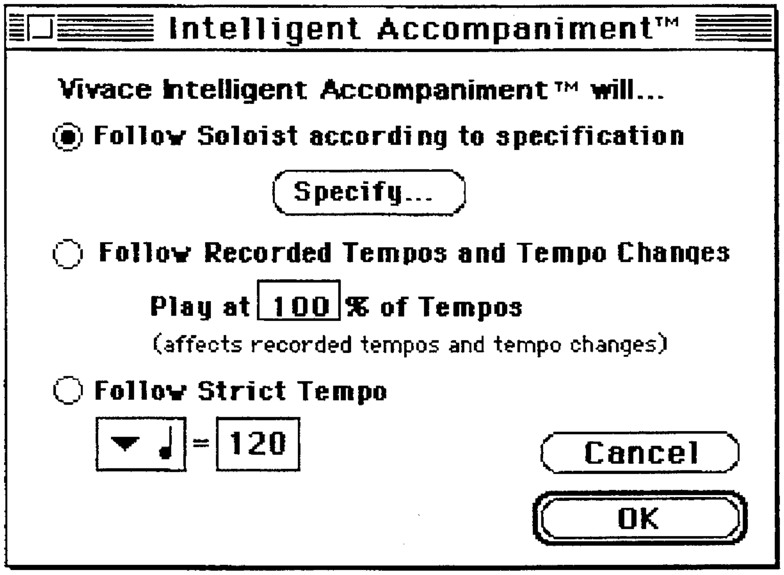
FIG. 24 is a screen display of an intelligent accompaniment selection window according to the present invention.
Figure 25:
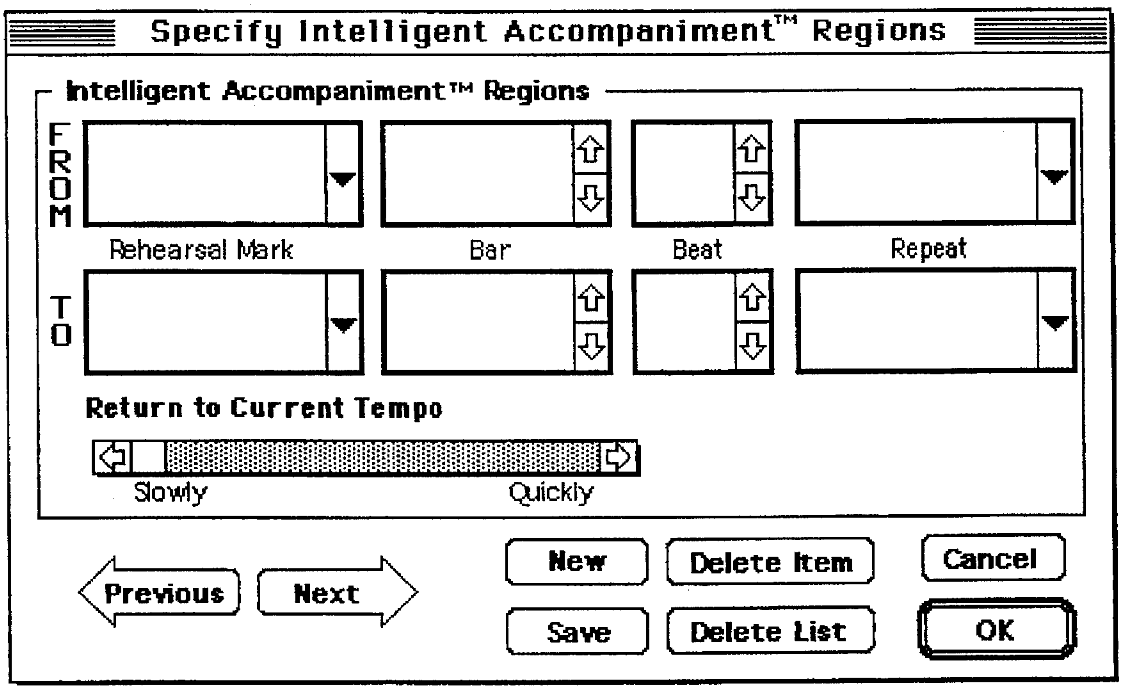
FIG. 25 is a screen display of a specify intelligent accompaniments regions window according to the present invention.
Figure 26:
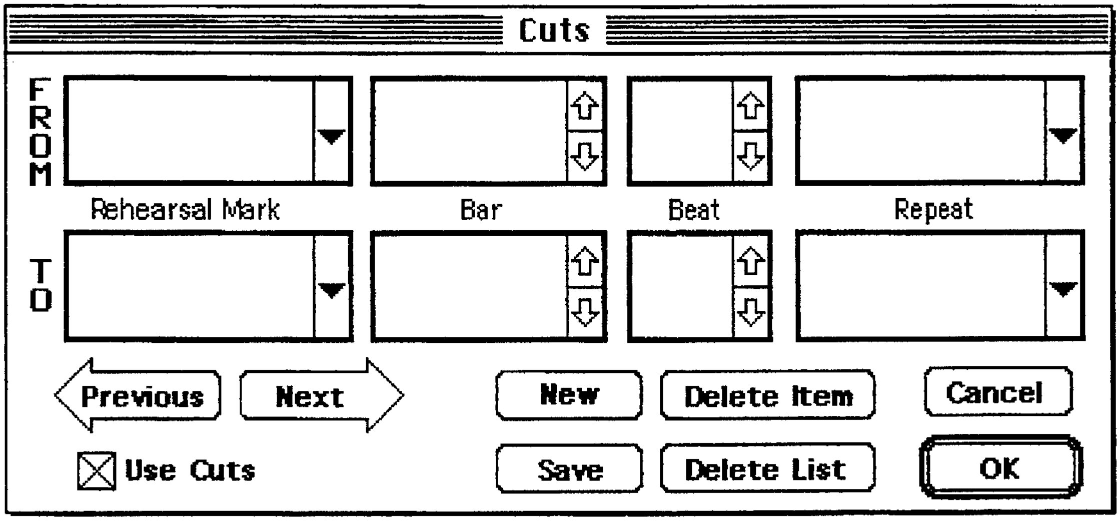
FIG. 26 is a screen display of a cuts window according to the present invention.
Figure 27:
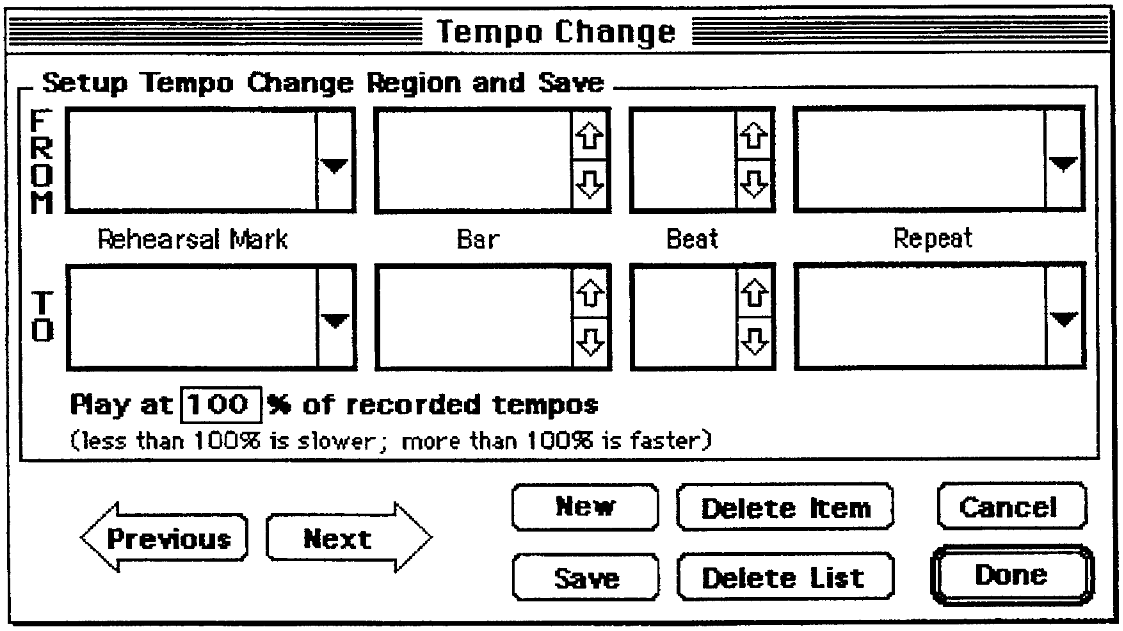
FIG. 27 is a screen display of a tempo change window according to the present invention.
Figure 28:
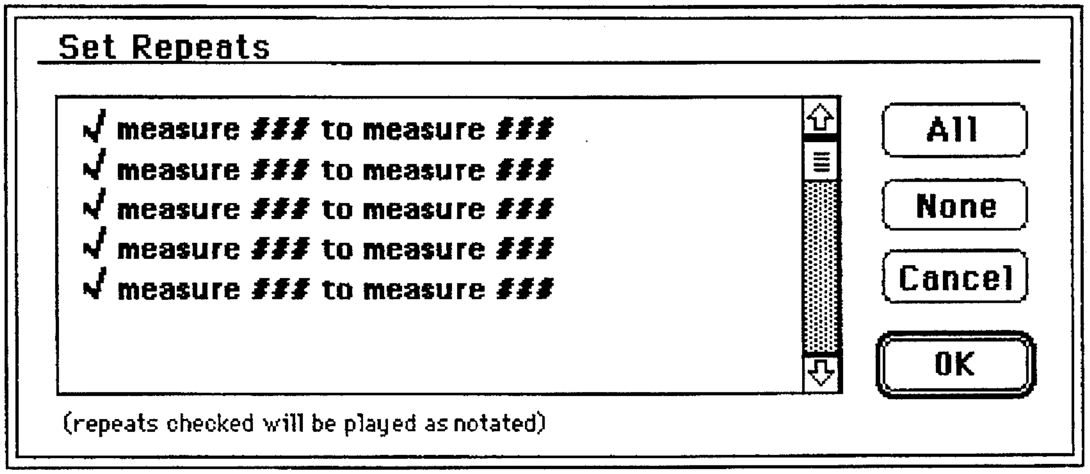
FIG. 28 is a screen display of a set repeats window according to the present invention.
Figure 30:
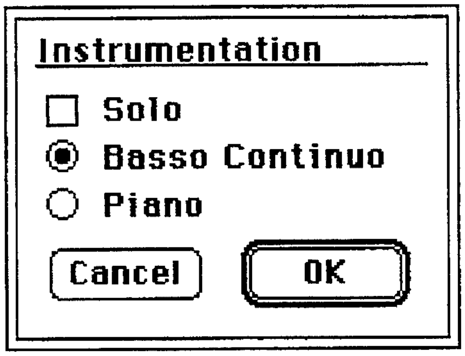
FIG. 30 is a screen display of an instrumentation window according to the present invention.
Figure 31:
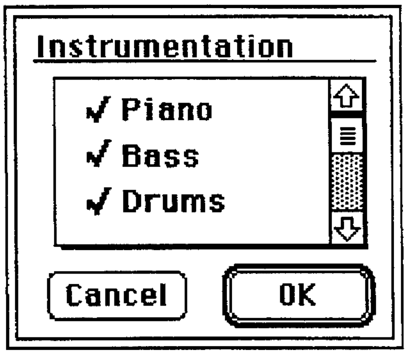
FIG. 31 is a screen display of a jazz instrumentation window according to the present invention.
Figure 33:
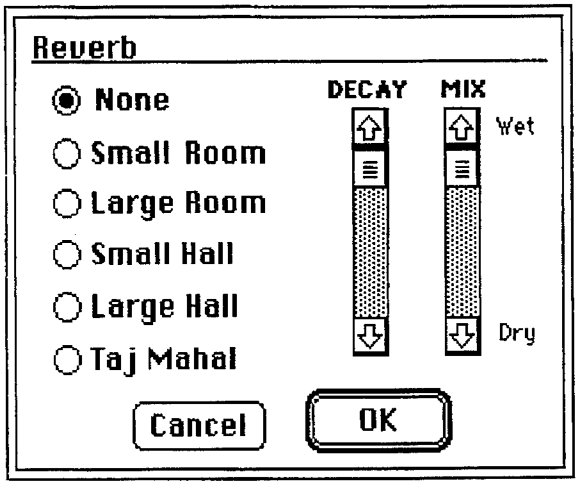
FIG. 33 is a screen display of a reverb window according to the present invention.

FIG. 16 describes a preferred settings software module. The settings module allows the editing of various parameters which govern the stylistic and accompaniment aspects of the system as shown in FIG. 35. The main settings module 1203 receives program commands and invokes a cuts module 1601, as shown in FIG. 26, to specify which sections of the musical performance score are not to be played; a tempo change module 1603 which sets which sections of the score are to be played at a faster or slower tempo than the predetermined tempo as shown in FIG. 27; a practice loop module 1605 allowing a user to specify a range of measures that will automatically repeat as shown in FIG. 20; an instrumentation module 1607 allowing a user to select differing instrumentations for jazz idioms as shown in FIG. 31, and non jazz idioms as shown in FIG. 30; an IA module 1609 as shown in FIG. 24 to enable and select an IA setting of either follow a performer according to specification, follow recorded tempos and changes, or follow strict tempo; a reverberation function 1611 allowing a user to select the amount and quality of reverberation echo to automatically be added to the generated accompaniment sounds as shown in FIG. 33; a user options module 1207 allowing a user to change performance and software features as shown in FIG. 29; and a select edition module 1613 allowing a user to choose a particular version of a musical performance score to play with as shown in FIG. 21.

Figure 17:
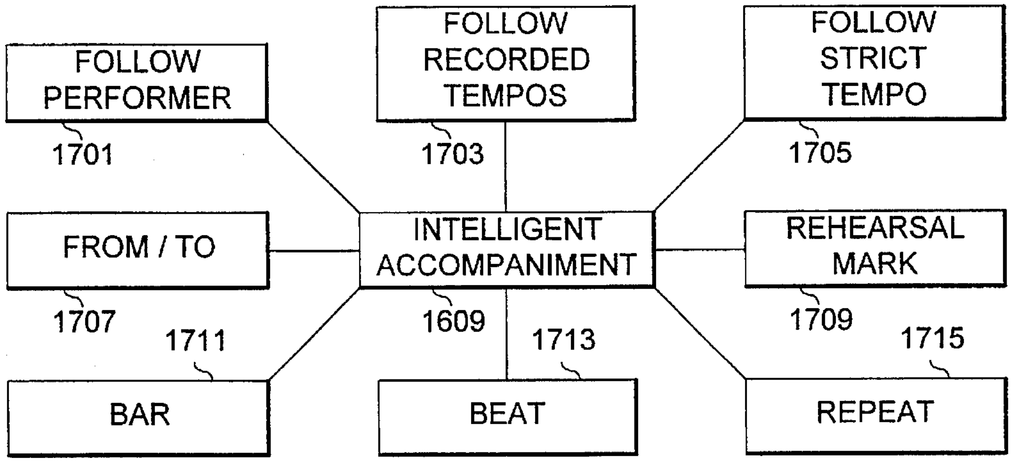
FIG. 17 is a block diagram of intelligent accompaniment software modules according to the present invention.

FIG. 17 describes a preferred IA software module. The IA module allows the editing of various parameters which govern the stylistic and accompaniment aspects of the system. The main IA module 1609 as shown in FIG. 24 allows a user to enable and select an IA setting of either follow a performer according to specification 1701, follow recorded tempos and changes 1703, or follow strict tempo 1705. A user may further select practice loop from/to functions 1707, wherein a user may specify a rehearsal mark 1709, bar 1711, beat 1713, or repeat 1715 as shown in FIG. 20.

Figure 18:
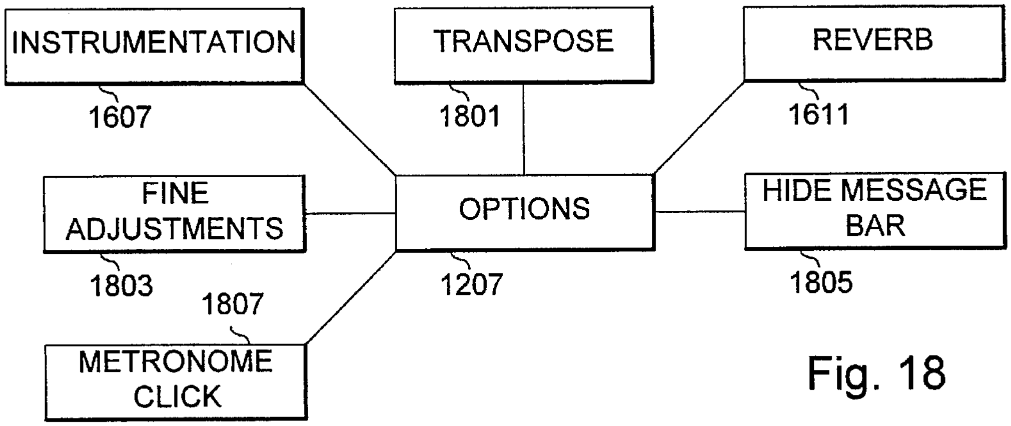
FIG. 18 is a block diagram of user options software modules according to the present invention.
Figure 32:
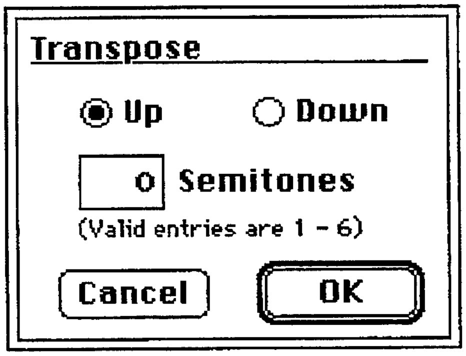
FIG. 32 is a screen display of a transpose window according to the present invention.
Figure 34:
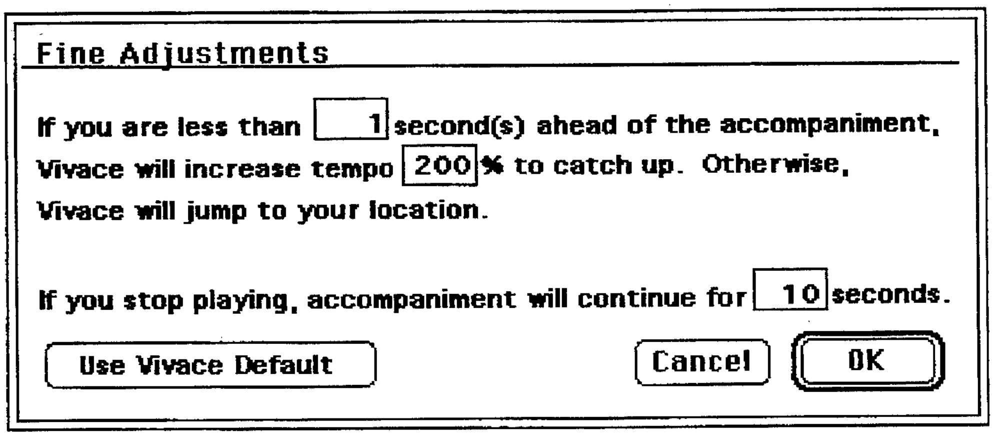
FIG. 34 is a screen display of a fine adjustments window according to the present invention.

FIG. 18 illustrates a preferred user options software module, displayed to the user as shown in FIG. 29. The IA module allows the editing of various parameters which govern the stylistic and accompaniment aspects of the system. The main user options module 1207 receives program commands and invokes an instrumentation module 1607 allowing a user to select differing instrumentations for jazz idioms as shown in FIG. 31, and non jazz idioms as shown in FIG. 30; a transpose module 1801 for transposing all transposable channels up or down a selected number of semitones as shown in FIG. 32; a reverberation function 1611 allowing a user to select the amount and quality of reverberation echo to automatically be added to the generated accompaniment sounds as shown in FIG. 33; a fine adjustments module 1803 for specifying either speeding up or jumping to the performer's current position within the score, and for setting the amount of time to provide accompaniment if the performer stops playing, as shown in FIG. 34; a hide message bar function 1805 to inhibit the display of messages to the user; and a metronome click function 1807 to enable or disable an audible click at a set tempo.

Because of a hardware processing delay in the conversion of notes of the soloist performance into MIDI data, an automated accompaniment system, if uncorrected, will always lag behind the performer by the amount of the pitch-to-MIDI conversion delay. The intelligent accompaniment of the present invention corrects for a pitch-to-MIDI conversion delay or other system delays by altering the accompaniment in real-time based upon the post-processing of past individual events of the soloist performance. Each event $E_t$ is time-stamped by the hardware module 207 (FIG. 2) so the system knows when the event occurred. In addition, a time value At is supplied by the hardware module 207 which represents the time difference between when a sound was first detected and when it is finally sent from the hardware module 207 to the workstation 111. Thus, to synchronize with the soloist and provide an accompaniment at the correct time, the system calculates the correct time $T_c$ to be: $T_c=E_t+\Delta t$, then uses $T_c$ as the place in the musical performance score where the soloist is now projected to be. The system outputs the appropriate notes at point $T_c$ in the musical score as the accompaniment.

Figure 4:
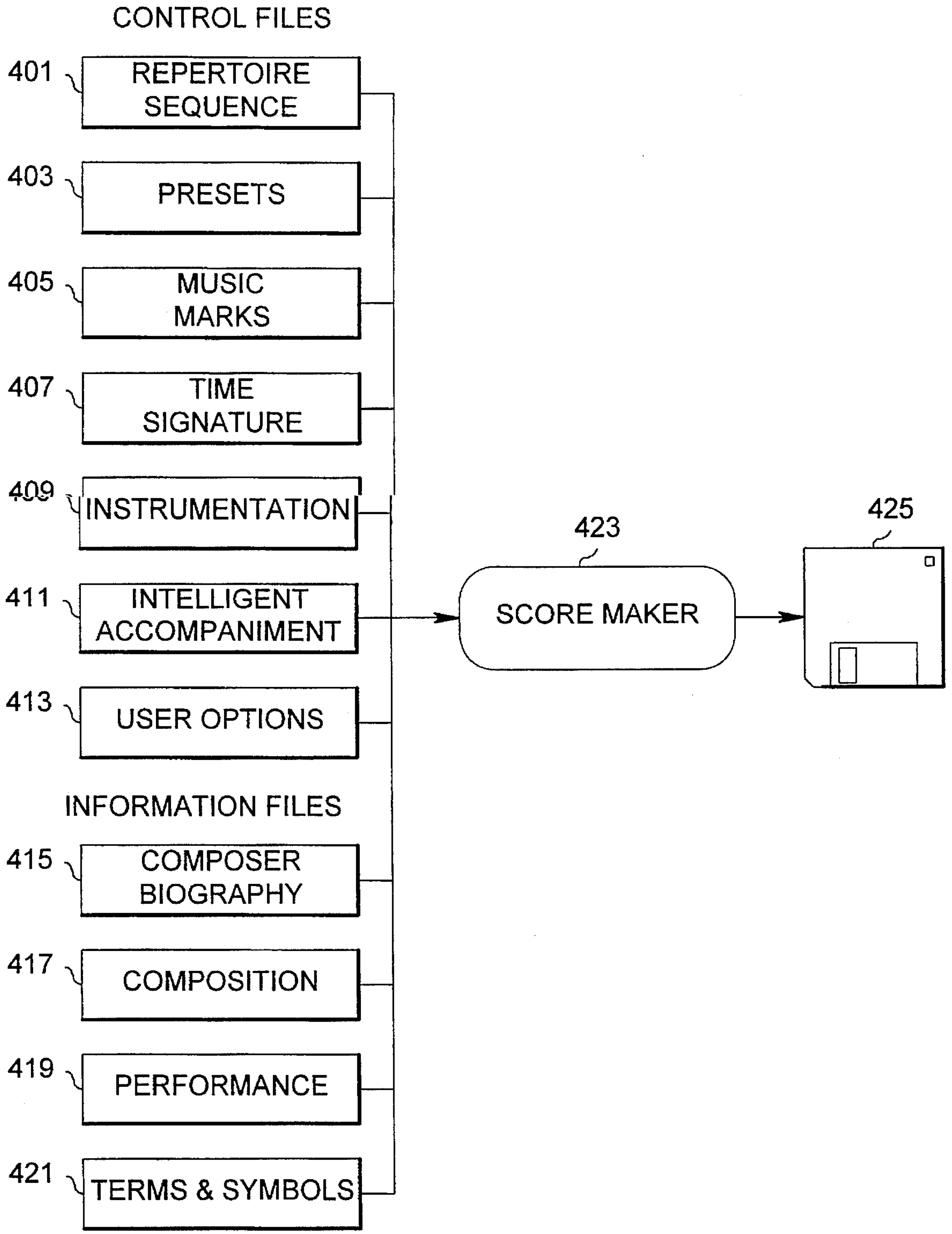
FIG. 4 is a block diagram of a file structure according to the present invention.

A repertoire file is preferably composed of a number of smaller files as shown in FIG. 4. These files are typically tailored individually for each piece of music. The files are classified as either control files or information files. The control files used by the application are preferably a repertoire sequence file 401 for the actual music accompaniment files, a presets file 403 for synthesizer presets, a music marks file 405 for rehearsal marks and other music notations, a time signature file 407 for marking the number of measures in a piece, whether there is a pickup measure, where time signature changes occur, and the number of beats in the measure as specified by the time signature, an instrumentation file 409 to turn accompanying instruments on or off, an intelligent accompaniment file 411 to set the default regions for intelligent accompaniment on or off (where in the music the accompaniment will listen to and follow the soloist), and a user options file 413 to transpose instruments and to set fine adjustments made to the timing mechanisms. The information files used by the application are preferably a composer biography file 415 for information about the composer, a composition file 417 for information about the composition, a performance file 419 containing performance instructions, and a terms and symbols file 421 containing the description of any terms used in the piece. A computerized score maker software tool 423 makes the musical performance score and assembles all control and information data files into a single repertoire file 425.

A repertoire sequence file 401 for a score is preferably in the standard MIDI Type 1 format. There are no extra beats inserted into the MIDI file to imitate tempo increases or decreases. The score maker software tool 423 typically does not perform error checking on the format of the MIDI data. There is only one repertoire sequence file per score.

A presets data file 403 for a score is preferably in the standard MIDI Type 1 file format. The presets are downloaded to the hardware module 207 (FIG. 2) for each score. No error checking is typically done on the format of the presets data file.

A music marks data file 405 is preferably created with any standard text processing software and the format of the file typically follows the following conventions:

1. There can be any number of rehearsal marks per file.
2. Any pickup notes that come before the first measure of the score are ignored. The first measure of a score is always Measure 1. Pickup notes are considered to be in measure 0.
3. Rehearsal marks appear on the screen exactly as they appear in the text file.
4. All fields must be entered and there must be a comma between each field. Each rehearsal mark is on a separate line within the file.
5. Rehearsal marks apply to only one edition, not the entire score file. Each edition can have a separate set of rehearsal marks or none at all. A single rehearsal mark consists of a rehearsal mark field, which is up to two printable characters, and a starting measure, which is the number of measures from the beginning of the score the rehearsal mark starts at.

A typical example of a rehearsal marks file is given below:

AA,1
B,5
23,25
cS,40
%*,50
q),90

Repeat information for the music marks data file 405 is preferably created with any standard text processing software and the format of the file typically follows the following conventions:

6. There can only be one Dal Segno (DS) or one Da Capo (DC). There may be none but not both.
7. Rehearsal letters cannot be used to indicate where a repeat starts and ends in the score. The starting and ending measures are relative to the beginning of the score.
8. The ending measure for a DC or DS will be where the Coda is in the music. This will be the last measure played before jumping to the Coda, not the measure that immediately follows the Coda.
9. All fields must be entered and there must be a comma between each field. Each repeat is on a separate line within the file. The repeats data preferably consists of the following fields:

Field 1. This field is the type of repeat and can only be one of the following: R, DC, or DS. Capital letters, all lowercase or mixed may be used. R is a plain musical repeat of some number of measures. DC and DS are Da Cape and Dal Segno, respectively.

Field 2. This field is the number of times the repeat section is taken; normally one, always one for a DC or DS.

Field 3. This field is the measure the repeat/DS/DC starts at. This is the first measure that is played as part of the section. The DC will almost always be 1, and the DS will be the measure with a segment number.

Field 4. This field is the end measure of the repeat/DS/DC.

Field 5, 6, etc. These fields are utilized to designate the number of measures (length in measures) in the alternate endings that a repeat might have.

Some typical examples of repeats are given below:

| Repeat: | Comment: |
|---|---|
| r, 1,10,11,0 | There is a repeat, taken once (i.e. repeat is played), at measure 10, ending at measure 11, with 0 measures in an alternate ending (there is no alternate ending). |
| r, 1,10,11,1,1 | There is a repeat, taken once (i.e. repeat is played), at measure 10, ending at measure 11, with 1 measure in the first ending and 1 measure in the 2nd ending. |
| r, 1,10,11,1,1,1 | There is a repeat, taken once (i.e. repeat is played), at measure 10, ending at measure 11, with 1 measure in the first ending and 1 measure in the 2nd ending, and 1 measure in the third. |

A time signature data file 407 that will be used to specify how many measures are in a piece, whether it contains a pickup measure (anacrusis), how many beats the pickup notes include, what measure a time signature change occurs, and how many beats are in that measure, is preferably created with any standard text processing software and the format of the file typically follows the following conventions:

1. There typically can be up to 999 measures per file. The first measure of a score is always Measure 1. The first record of the time signature file indicates how many measures long the score is, not counting any repeats.
2. Pickup measures are indicated by measure zero (0). Pickup notes are considered to be in measure 0.
3. For pickup measures, the number of beats included in pickup note(s) is specified.
4. There can be any number of time signature changes per file.
5. Each record typically consists of two fields. All fields must be entered and there must be a comma between each field. Each time signature change goes on a separate line in the file. There must be a carriage return after each line, including the last line in the file.

A typical example of a time signature data file is given below:

| Line: | Comment: |
|---|---|
| 0,100 | The first field is always 0, this piece is 100 measures long. |
| 0,1 | This piece has a pickup measure (0) with the pickup note(s) in one beat. |
| 1,4 | All pieces start at measure 1. This piece begins with four beats in the time signature of 4/4 (or 4/8 and so on). There are no time signature changes. |
| 0,150 | The first field is always 0, this piece is 150 measures long. |
| 1,4 | There is no pickup measure. The piece begins with 4 beats in a time signature (of 4/4, or 4/8 and so on). |
| 12,3 | In measure 12, the time signature changes to 3/4 (or 3/8 and so on). |

An instrumentation data file 409 is preferably created with any standard text processing software and the format of the file typically follows the following conventions:

1. All fields must be entered and there must be a comma between each field. Each instrumentation is on a separate line within the file.
2. If the list is missing channel numbers, the channel will not be played. Any channel to be played must be entered in the file.

3. There must always be an Instrumentation/Transpose Track File for each score. The preferred accompaniment tracks are given below:

Solo track line. The solo track will always appear on the first line in the file and will usually be track 1, or track 0 for pieces in the jazz idiom. The default play status is off so it is not necessary to indicate it here.

Accompaniment line. This track names the type of accompaniment (Orchestral, Continuo, Ensemble, or Concert Band), and indicates the default status to be set in the instrumentation dialog.

Instrumentation tracks line. This track is a list of the MIDI tracks utilized for the accompaniment. Valid entries are typically 1 through 64, inclusive. The tracks do not have to be in order.

Transpose Flag line. This track lists for each track in the immediately previous line, and in the same order, whether or not the track can be transposed. 'T' indicates a transposable staff, 'F' indicates a track that cannot be transposed.

A typical example of a tracks file is given below:

1,Solo
Continuo, on
2,3,4,5
T,T,F,T
Piano, off
6

An IA data file 411 is preferably created with any standard text processing software and the format of the file typically follows the following conventions:

1. All fields must be entered and there must be a comma between each field. Each region is on a separate line within the file.
2. A region is typically not specified by a repeat. A separate file of this type must be specified for each edition supported. A region specified for IA ON preferably consists of the following fields:

Field 1: Tendency setting (1-5).

Field 2: Bar number (counted from the beginning of the score) of the starting point of the region.

Field 3: Beat number of the starting point of the region.

Field 4: Bar number (counted from the beginning of the score) of the ending point of the region.

Field 5: Beat number of the ending point of the region.

A typical example of an IA data file is given below:

5,20,1,10,1
2, 5,2,1,4

A user options data file 413 that will be used to set the hardware timing, skip interval, catch-up and quit interval, is preferably created with any standard text processing software and the format of the file typically follows the following conventions:

1. All fields must be entered and there must be a comma between each field.
2. There is typically always a user options default file for each score. A single line specified for user options preferably consists of the following fields:

Field 1: Hardware timing (anticipation).

Field 2: Skip interval.

Field 3: Catch up.

Field 4: Quit interval (patience).

A typical example of a user options data file is given below:

20,1,200,10

An information text data file such as a composer biography file 415, a composition file 417, a performance file 419, or a terms and symbols file 421 is preferably stored as a standard tagged image format file (TIFF). Carriage returns are used to separate one paragraph from another. Indentation of paragraphs is typically accomplished by using the space bar on the keyboard to insert blank spaces. Typically, any standard graphics creation software may be used to create associated graphics, but the final graphic file is preferably inserted into the text file for which it is intended. Graphics are displayed in a text file such that the graphic takes the position of a paragraph within the text. Text does not typically wrap around the graphic.

Communications Protocols

The communications protocols between the workstation 111 and the hardware module 207 (FIG. 2, FIG. 5) may preferably classified as initial communication, performance communication, other communication, and communication codes as given below:

Initial Communication

Are We Connected. Whenever a score is loaded from disk, the workstation IA software 109 (FIG. 1) will send the hardware module 207 an electronic message "AreYouThere." The hardware module responds with IAmHere.

Software Dump. After their initial communication, the workstation IA software 109 will download software and data to the hardware module 207 by sending a SoftwareDump. The hardware module 207 responds with SoftwareReceived. This allows for concurrent software upgrades.

Self-Test Diagnostics. Following the software dump, the workstation IA software 109 will send ConductSelfTest, to which the hardware module 207 responds with SelfTestResult. If the test result is anything but TestOK, the workstation 111 displays a dialog box describing the problem, and offering possible solutions.

Performance Communication

Reset Synth. After a score is loaded from disk, the workstation IA software 109 will send ResetSynth. The hardware module 207 will reset all of the synthesizer's parameters to their defaults, and then respond with SynthReset.

Preset Dump. After a score is loaded from disk, the workstation IA software 109 will have to send custom presets to the hardware module's synthesizer. The workstation 111 will use Emu's standard system-exclusive preset format.

Pitch Recognition Setup. After a score is loaded from disk, the workstation IA software 109 will send ScoreRange, which are the lowest and highest notes scored for the melody. The hardware module 207 responds with ScoreRangeReceived. The hardware module will use this range to set breakpoints for its input filter.

Pitch Follower. Immediately before playing a score, the workstation IA software 109 will send either TurnOnPitchFollower or TurnOffPitchFollower, depending on the workstation's following mode. The hardware module 207 responds with PitchFollowerOn or PitchFollowerOff.

Expected Note List. While a score is playing (and if the workstation is in FollowPerformer mode) the workstation IA software 109 will send ExpectNotes, a list of the next group of melody notes to expect. The hardware module 207 responds with ExpectNotesReceived. This will allow a pitch follower module within the hardware 207 to filter out extraneous notes. Since ExpectNotes is sent continuously during playback, this message and response will determine if the hardware module 207 is still connected and functioning.

Synthesizer Data Stream (Workstation→Hardware Module). The score sequence for the hardware module's synthesizer will be standard MIDI Channel Voice Messages. (NoteOn, NoteOff, Preset, PitchBend, etc.)

Pitch Recognition Data Stream (Hardware Module→Workstation). When the hardware module 207 senses and analyzes a NoteOn or NoteOff, it sends a MIDI Note message informing the workstation of the note value. The NoteOn message is followed by a MIDI ControlChange (controller #96) containing the time in milliseconds it took to analyze the note. For example, if it took the hardware module 12 milliseconds to analyze a Middle C, the following two messages would be sent:

| | |
|---|---|
| 1: | 90 60 00 (NoteOn, note#, velocity) |
| 2: | B0 60 0C (ControlChange, controller #96, 12 milliseconds) |

Other Communication

Tuning. At the performer's discretion, the workstation IA software 109 will send ListenForTuning. The hardware module 207 responds with ListeningForTuning. While the hardware module is analyzing the note played by the performer, it responds at regular intervals with the MIDI note being played, followed by a PitchBend Message showing the deviation from normal tuning. The typically 14 bits of the PitchBend Message will be divided equally into one tone, allowing for extremely fine tuning resolution. A perfectly played note would have a PitchBend value of 2000 hex. If the performer wishes to actually set the hardware module to this tuning, the workstation will send SetTuning, followed by the new setting for A440. The hardware module 207 responds with TuningSet. If the performer cancels the ListenForTuning while the hardware module is analyzing notes, the workstation IA software 109 will send StopTuning. The hardware module 207 responds with TuningStopped. The workstation IA software 109 may also send the hardware module GetTuning. The hardware module 207 responds with TuningIs, followed by the current deviation from A440.

Reverb Setup. At the performer's discretion, the workstation IA software 109 will send SetReverb followed by the parameters room, decay, and mix, as set in the workstation's reverb dialog box. The hardware module 207 responds with ReverbSet. The workstation IA software 109 may also send the hardware module GetReverb. The hardware module 207 responds with ReverbIs, followed by the current reverb parameters.

Protection. At random times, while a score is playing, the workstation IA software 109 sends ConfirmKeyValue. The hardware module 207 responds with KeyValueIs, followed by the key-value of the protection key. If the key-value does not match the score's key-value, the workstation IA software 109 will stop playing and display a dialog box instructing the performer to insert the proper key into the hardware module 207. If the key value matches, the workstation IA software 109 sends KeyValueConfirmed. The hardware module 207 may also send KeyValueIs at random intervals to protect itself from being accessed by software other than the workstation IA software 109. If the key-value matches the currently loaded score, the workstation IA software 109 responds with KeyValueConfirmed. If the hardware module 207 does not receive this confirmation, it ignores the regular MIDI data until it receives a ConfirmKeyValue from the workstation IA software 109, or a new protection key is inserted. It is possible that a "no protection" protection key be used which disables the key-value messages, allowing the hardware module to be used as a normal MIDI synthesizer. When a new protection key is inserted into the hardware module, the hardware module 207 will send NewKeyValueIs, followed by the new key-value. If this does not match the currently loaded score, the workstation IA software 109 should offer to open the proper score for the performer. If the key value matches, the workstation responds with KeyValueConfirmed.

Communication Codes

The workstation to hardware module codes have the least significant bit set to zero. Hardware module to the workstation codes have the least significant bit set to one. All values are in hex.

| | |
|---|---|
| General Format | |
| F0 | (Start of System Exclusive Message) |
| BOX or the workstation identification byte(s) | |
| CommunicationCode | |
| Data byte(s) | |
| F7 | (End of System Exclusive Message) |
| AreYouThere | 10 |
| IAmHere | 11 |
| SoftwareDump | 12 nn . . . |
| SoftwareReceived13 | |
| nn . . . = BOX's software | |
| ConductSelfTest14 | |
| SelfTestResult 15 nn | |
| nn = result code (00 = TestOK, 01-7F = specific problems) | |
| ResetSynth | 16 |
| SynthReset | 17 |
| TurnOnPitchFollower20 | |
| PitchFollowerOn21 | |
| TurnOffPitchFollower22 | |
| PitchFollowerOff23 | |
| ScoreRange | 24 n1 n2 |
| ScoreRangeReceived25 | |
| n1 = lowest note, n2 = highest note | |
| ExpectNotes | 26 nn . . . |
| ExpectNotesReceived27 | |
| nn . . . = note list | |
| ListenForTuning30 | |
| ListeningForTuning31 | |
| StopTuning | 32 |
| TuningStopped | 33 |
| SetTuning | 34 n1 n2 |
| TuningSet | 35 |
| GetTuning | 36 |
| TuningIs | 37 n1 n2 |
| n1 n2 = Pitch Bend Message deviation from A440 | |
| SetReverb | 40 n1 n2 n3 |
| ReverbSet | 41 |
| GetReverb | 42 |
| ReverbIs | 43 n1 n2 n3 |
| n1 = room, n2 = decay, n3 = mix | |
| ConfirmKeyValue70 | |
| KeyValueIs | 71 nn |
| KeyValueConfirmed72 | |
| NewKeyValueIs | 73 nn |
| nn = key-value | |

Data Structures and File Formats

The data for user options is given below. This is information that the user sets through PM menus. It is broken down as follows:

User Options (1) Following Mode
(1) Type of Countoff
(2) Number of bars to countoff
(2) Input Sound
(2) MIDI Note value for Input Sound
(2) Controller value for Input Sound
(2) Playback Position Indictor update flag
(2) Metronome Sound (Mac or IVL box)
(2) Metronome On/Off
(2) Metronome Accented on First Beat
(2) Metronome Flash Icon for tempo
(2) Metronome Tempo Note (for fixed following,)
(2) Metronome Tempo (beats per minute for fixed following)
(2) Patience
(2) Anticipation
(2) Skip Interval
(2) Catch-Up Rate
(2) Reverb Type (Large Hall, etc.)
(2) Mix
(2) Reverb Time
(2) Transposition Value
(1) End of Chunk marker

---

```
File Format (RIFF description)
<VIVA-form>->              RIFF('IVIVAI'
                           <INFO-list>            // file INFO
INTELLIGENT ACCOMPANIMENT APPARATUS AND METHOD
                           <vkey-ck>              // key(s)
                           <opts-ck>              // default options
                           <pamp-list>            // pamphlet data
                           <prst-ck>              // presets
                           <scdf-ck>              // score definition
                           <scor-ck>              // score data (repeats &
                                                        marks)
                           <tmpo-ck>              // default tempo data
                           [<cuts-ck>]            // default cuts data
                           [<ia-ck>]              // default IA region data
                           <itrk-list>            // instrument tracks data
                           <user-list>)           // user data (user saved
                                                  // File only)
// File Info
<INFO-list> ->             LIST('IINFO'          { <ICOP-ck>¦     // copyright
                           <ICRD-ck> ¦            // creation date
                           <INAM-ck> ¦            // name of content
                           <iedt-ck> ¦            // edition
                           <iver-ck> }■ )         // version
// Keys
<vkey-ck> ->               vkey(keystring:BSTR)
// Protection key(s)
// Pamphlet Data
<pamp-list>->              LIST('pamp' { <pbio-ck> ¦
// composer's biographical info
                           <pcmp-ck> ¦            // composition info
                           <ptrm-ck> ¦            // terms
                           <phnt-ck>}■)           // performance hints
Default Options
<opts-ck> ->               opts( <options:OPTIONS> )
// Options struct
// Presets
<prst-ck> ->               pest( <prst-data>)
// MIDI sysex data
Score Definition
<scdf-ck> ->               scdf( <DeltaDivision:sl6bit>
// ticks per beat
                    <StartMeasure:ul6bit>              // beginning measure
                    <NumberOfMeasures:ul6bit>          // number of measures
// Score Map
<scor-ck> ->               scor( {<delta time:varlen>
<event:score_event_type> } ■ )      // event list
// Tempo Map
INTELLIGENT ACCOMPANIMENT APPARATUS AND METHOD
<tmpo-ck> ->               tmpo( {<delta_time:varlen>
<event:tempo_event_type> } ■ )      // event list
// Cuts Map
<cuts-ck> ->               cuts( {<from_delta_time:varlen>
<to_delta_time:varlen>}■ )
// event list
// Intelligent Accompaniment Map
<ia-ck>                    ->         ia( {<delta_time:varlen>
<tendency:u8bit> }■ )          // event fist
// Instrumentation Track(s)
<itrk-list>->              LIST('itrk' { <solo-ck> ¦
// Soloist track
                    <inst-ck> } ■ )
                    // Instrument track
```

-continued

```
                    // User Saved Options
<user-list>->               user( {<opts-ck> ¦
Menu & Dialog Options
                    <tmpo-ck> ¦                 // User Tempo map
                    <cuts-ck> ¦                 // User cuts map
                    <ia-ck> } ■ )               // User IA Map
Options struct
<OPTIONS> ->                struct {
                            <UseOptions:u8bit>
"Use" checkboxes: >IA, Cuts, Repeats, Metronome, Msg
Bar>                            <CountoffOption:u8bit>
// <Soloist, 1 Bar, 2 Bar, with or w/o Click>
                                <FromPosition:u32bit>
// Play From position
                                <ToPosition:u32bit>
// Play To position
                                <SelectIA:u8bit>
IA Following: <Soloist, Tempo %, Strict Tempo>
                                <PlayAtTempoPct:ul6bit>
Tempo & EditBox value
                                <PauseBars:u8bit>
// Pause for n Bars EditBox value
INTELLIGENT ACCOMPANIMENT APPARATUS AND METHOD
                                <PlayAtBPM:ul6bit>
// Beats per Minute EditBox value
                                <Transpose:s8bit>
// Transpose value
                                <ReverbType:u8bit>
<None, Sm Room, Lg Room, Sm Hall, Lg Hall, Taj Mahal>
                                <ReverbDecay:u8bit>
// Reverb Decay value
                                <ReverbMix:u8bit>
// Reverb Mix (Dry to Wet) value
                                <Anticipation:ul6bit>
// Playback Anticipation value.
                                <SkipInterval:ulGbit>
Interval threshold for accomp to skip ahead
                                <Acceleration:ulGbit>
// Rate for accomp to race ahead
                                <Patience:ul6bit>
// Patience value
                    }
// Soloist track
<solo-ck> ->                solo( <thdr-ck> <MTrk-ck> )
// solo track (header followed by MIDI data)
// Instrument track
<inst-ck> ->                inst( <thdr-ck> <MTrk-ck> )
instrument track (header followed by MIDI data)
// Track header
<thdr-ck> ->                thdr( <Flags:ul6bit>
Track Flags: Transposable, Play Default
                                <Name:BSTR>
// Name of the Instrument/Group
```

Match Algorithm

The algorithm for matching an incoming note of the soloist performance with a note of the performance score is given below:

```
definitions:
    interval is specified as a minimum difference for
    determining tempo, embellishments, missed notes,
    skipped notes, etc. (eg. interval = 1 measure)
    skipinterval is the threshold that a wrong note is not
    matched with the expected event. (eg.
    (MaxTempoDeviation * BPM * TPB) / 60 )
if (Paused)
    search for event
    if (found) set expected event.
if (eventnote == expectednote)              // note is expected
{
    if ((expectedtime - eventtime) > interval) // more than 1
                                               // interval
{
        if (eventtime < (lasttime + lastduration)) // check
                    // for possible embellishment
```

-continued

```
            skip current event.
        else
            jump to expected event.
             set last matched event.    //
             clear tempo average.       // used for tempo
                                        // calculations
    }
    else                                // within interval
    {
        if ( last matched event)
            compute tempo from eventtime && expectedtime &&
                last matched event.
            average into tempo average.
            increase tempo average items.
        else
            clear tempo average.        // used for tempo
                                        // calculations
        jump to expected event.         //
        set last matched event.
    }
}
else                                    // note isn't expected.
```

-continued

```
{
INTELLIGENT ACCOMPANIMENT APPARATUS
AND METHOD
     if (eventtime < (lasttime + lastduration))   /     check for
                                                 // possible
embellishment
          skip current event.
     else
     {
          if ((expectedtime - eventtime) <= skipinterval)
                    // less than skipinterval (wrong note)
                    {
               jump to expected event.
               set last matched event.
          }
          else
          }
               search for current event in expectedtime +-
                    interval.
               if ( found )          // event in this interval. {
                  if ((foundtime - eventtime) <= skipinterval)
                         // less than skipinterval
(skipped)                   }
                         if ( last matched event
                              compute telmpo from eventtime &&
                                   expectedtime.
                              average into tempo average.
                              increase tempo average items.
else
                         clear tempo average.       // used for tempo
                                                    // calculations
jump to expected event.
                         set pausetime to currenttime + patience.
                         set last matched event.
                    }
                    else
                      skip current event // probably not a skip.
                      }
                    else
                         skip current event
               }
          }
}
```

-continued

```
if (tempo average items > set tempo threshold)
     set new tempo.
if lasttime > Patience
     Pause.
     clear lastevent
```

The present invention is to be limited only in accordance with the scope of the appended claims, since others skilled in the art may devise other embodiments still within the limits of the claims.

What is claimed is:

1. A method for preventing the unauthorized use of a repertoire data file with a digital computer and a data cartridge, the repertoire data file having a serial number, file length value, and a predetermined series of target data keys each generated by one of a series of different encryption algorithms, the method comprising the steps of:

(a) extracting the serial number and the file length value from the repertoire data file;

(b) selecting an encryption data key from a predetermined series of data keys contained in the data cartridge;

(c) using one of the series of different encryption algorithms and the selected encryption data key to encrypt the serial number and file length value to generate a resultant data key;

(d) comparing the resultant data key to one of the series of target data keys; and (e) allowing access to the repertoire data file if the resultant data key matches one of the series of target data keys.

2. The method of claim 1 wherein the file length value is a cyclical redundancy check (CRC) value.

* * * * *